US006840727B1

(12) United States Patent
Vassiliou

(10) Patent No.: US 6,840,727 B1
(45) Date of Patent: Jan. 11, 2005

(54) FOLDED SHEET METAL FASTENER

(75) Inventor: Eustathios Vassiliou, Newark, DE (US)

(73) Assignee: Termax Corporation, Schaumburg, IL (US)

( * ) Notice: Subject to any disclaimer, the term of this patent is extended or adjusted under 35 U.S.C. 154(b) by 0 days.

(21) Appl. No.: 10/607,863

(22) Filed: Jun. 27, 2003

Related U.S. Application Data

(62) Division of application No. 09/969,563, filed on Oct. 2, 2001, now Pat. No. 6,629,809.
(60) Provisional application No. 60/246,634, filed on Nov. 8, 2000, provisional application No. 60/249,996, filed on Nov. 20, 2000, provisional application No. 60/267,281, filed on Feb. 8, 2001, provisional application No. 60/283,266, filed on Apr. 12, 2001, provisional application No. 60/289,343, filed on May 7, 2001, and provisional application No. 60/302,194, filed on Jun. 29, 2001.

(51) Int. Cl.$^7$ ................................................ F16B 37/04
(52) U.S. Cl. ...................... 411/173; 411/182; 411/112
(58) Field of Search ..................... 411/173–175, 182, 411/523, 524, 112, 508, 913

(56) References Cited

U.S. PATENT DOCUMENTS

| | | | | |
|---|---|---|---|---|
| RE21,769 E | * | 4/1941 | Tinnerman | 411/174 |
| 2,283,122 A | * | 5/1942 | Murphy | 411/173 |
| 2,369,962 A | | 2/1945 | Gisondi | 85/5 |
| 2,376,167 A | | 5/1945 | Mitchell | 85/36 |
| 2,400,545 A | | 5/1946 | Kost | 85/5 |
| 2,430,555 A | | 11/1947 | Burke | 85/36 |
| 2,612,927 A | | 10/1952 | Aylor | 411/173 |
| 2,627,294 A | * | 2/1953 | Bedford, Jr. | 411/173 |
| 2,720,135 A | | 10/1955 | Gisondi | 85/2.4 |
| 3,426,817 A | | 2/1969 | Parkin et al. | 151/41.75 |
| 3,486,158 A | | 12/1969 | Soltysik et al. | 339/14 |
| 4,818,164 A | * | 4/1989 | Kazyak | 411/82 |
| 4,826,375 A | | 5/1989 | Holton | 411/174 |
| 4,925,351 A | | 5/1990 | Fisher | 411/182 |
| 5,249,900 A | | 10/1993 | Mitts | 411/182 |
| 5,632,584 A | | 5/1997 | Acevedo | 411/182 |
| 5,636,891 A | | 6/1997 | Van Order et al. | 296/37.7 |
| 5,919,019 A | | 7/1999 | Fischer | 411/182 |
| 6,095,734 A | | 8/2000 | Postadan et al. | 411/182 |

FOREIGN PATENT DOCUMENTS

DE 2456740 8/1976

* cited by examiner

Primary Examiner—Flemming Saether
(74) Attorney, Agent, or Firm—E. Vassiliou

(57) ABSTRACT

This invention pertains fasteners which are characterized by easy insertion and extraordinarily difficult separation of items that they attach together. This is achieved by a combination of snapping segments with multi-engagement configurations of engageable holes. The snapping segments may comprise anti-opening and/or anti-sliding portions, which immensely increase the strength with which the fasteners hold the objects together. Provision of an elastic body in the vicinity of the bottom section of the fasteners provides water and gas proof properties, and further eliminates squeaking noises. Vehicles comprising objects connected together by the fastening devices described and claimed herein are part of the instant invention.

24 Claims, 17 Drawing Sheets

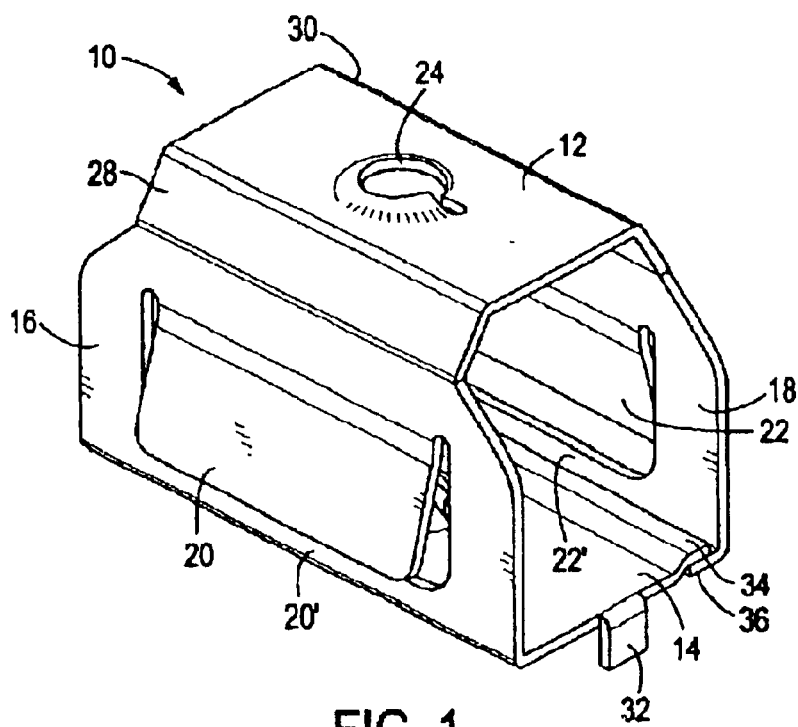
FIG. 1
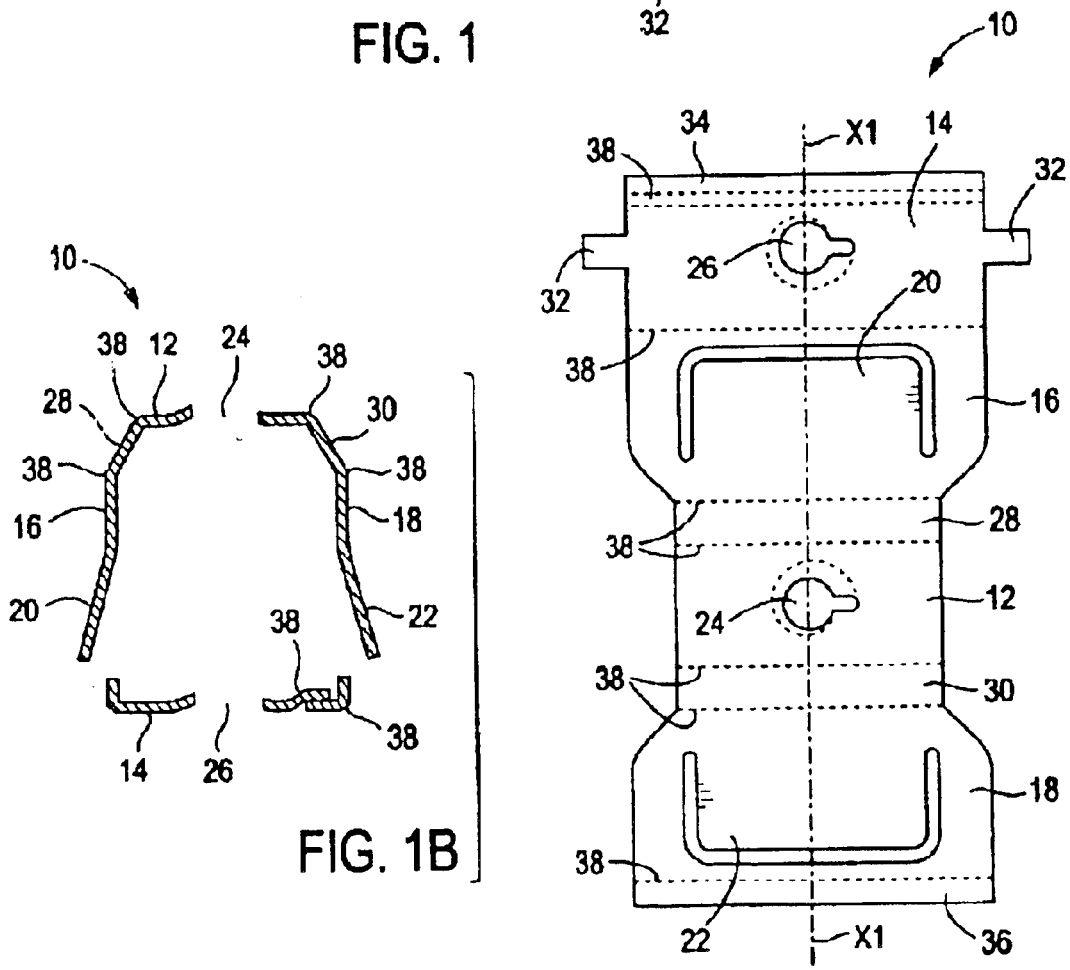
FIG. 1B
FIG. 1A

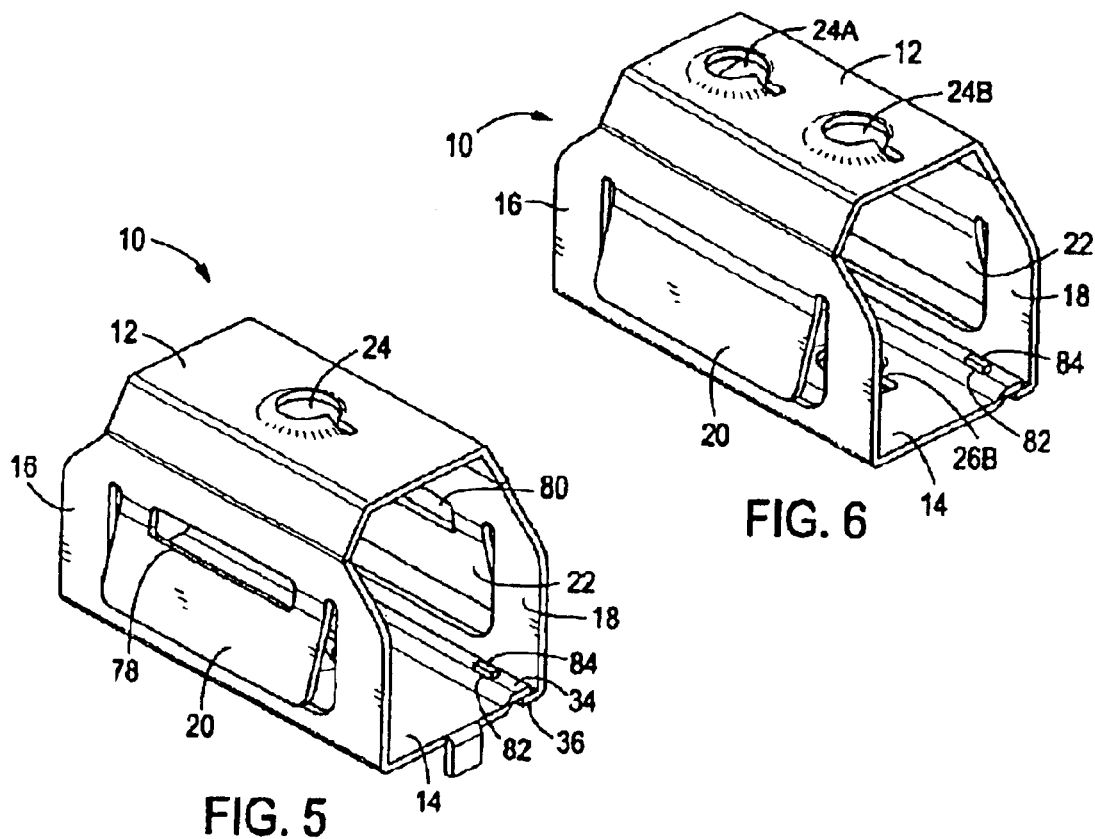
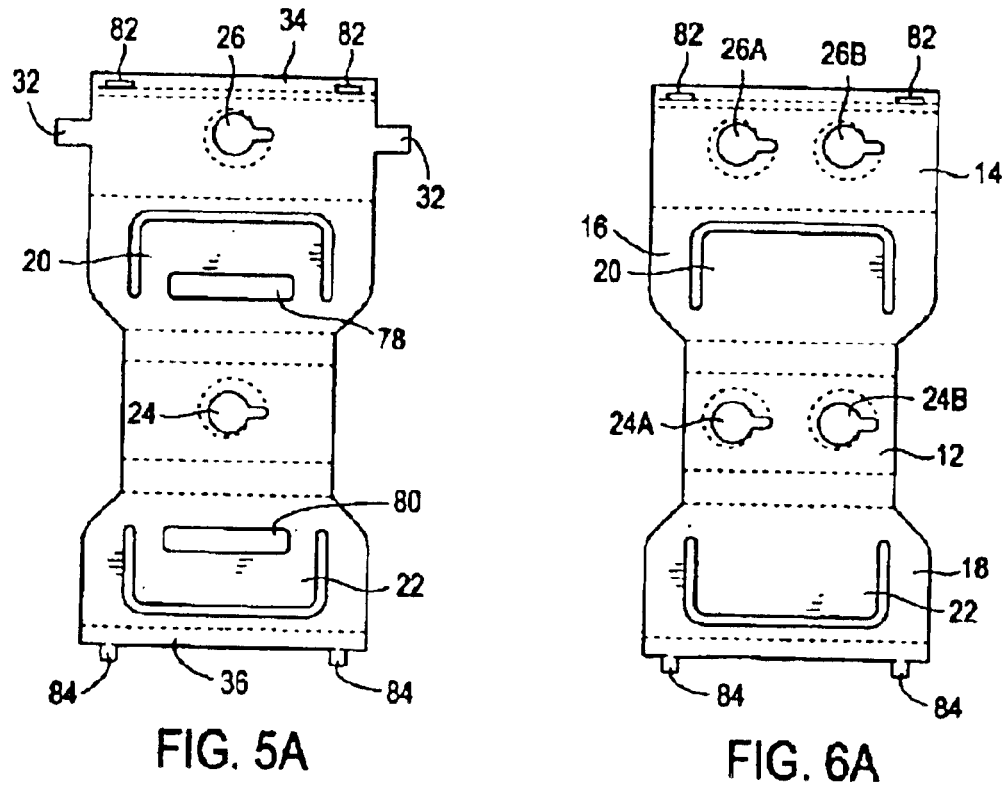

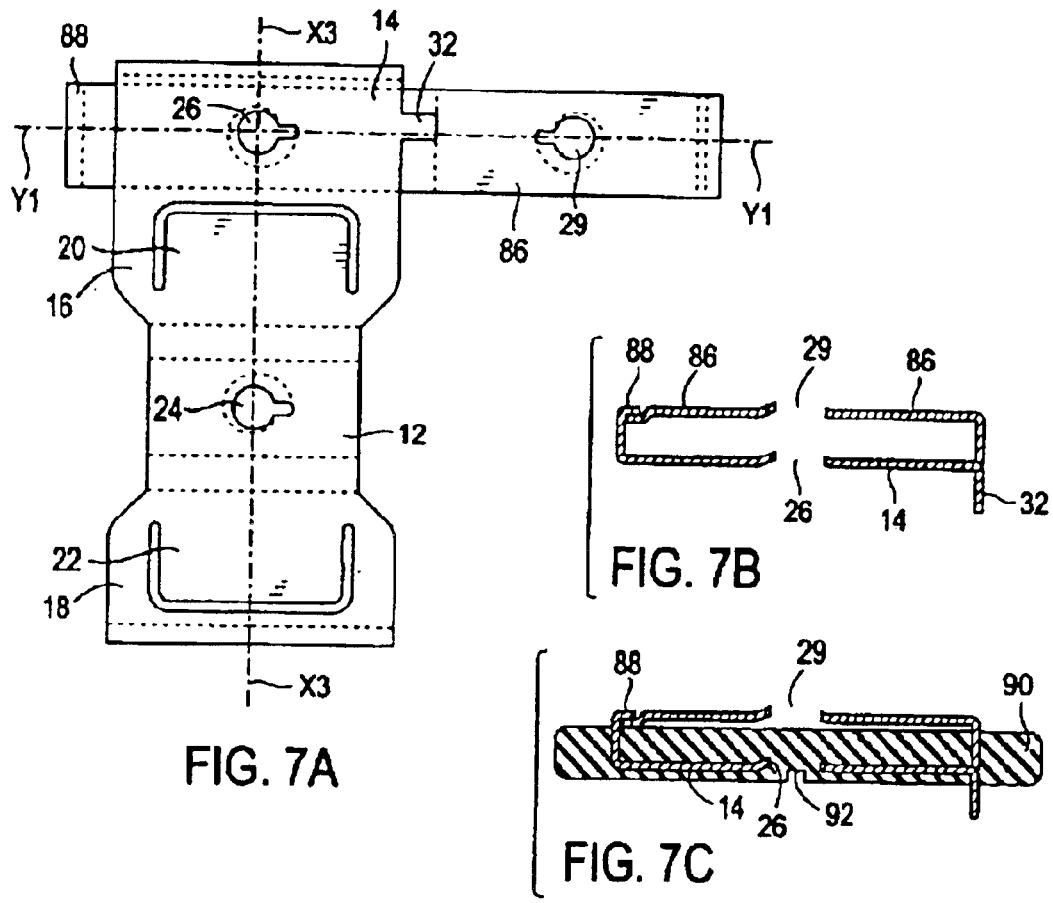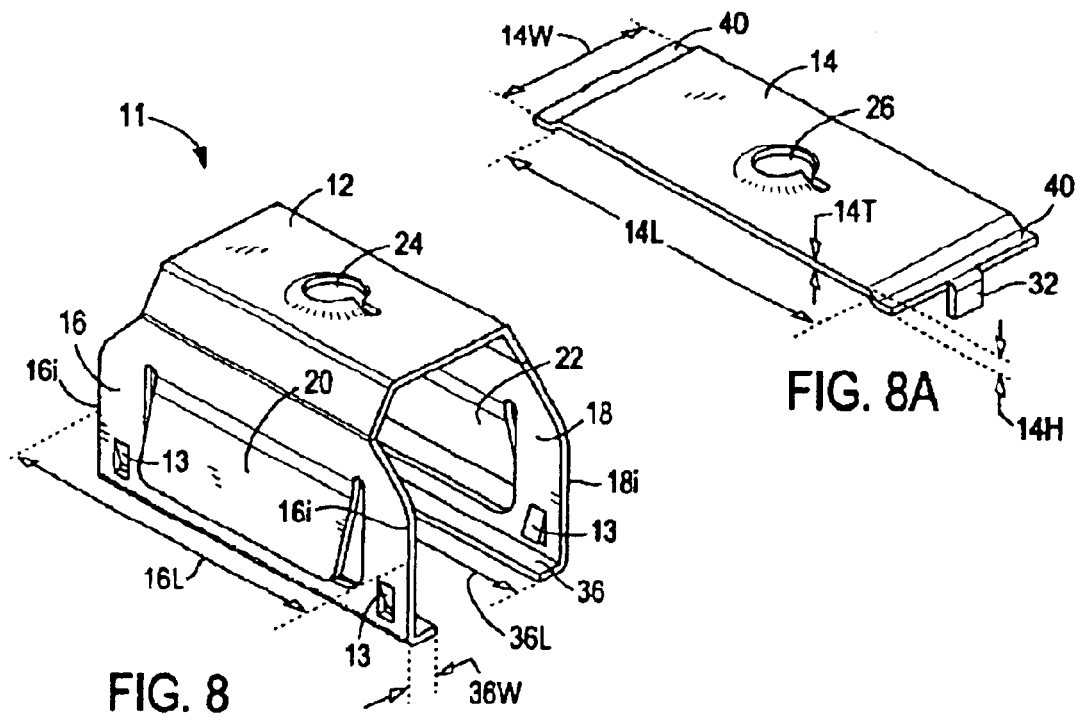

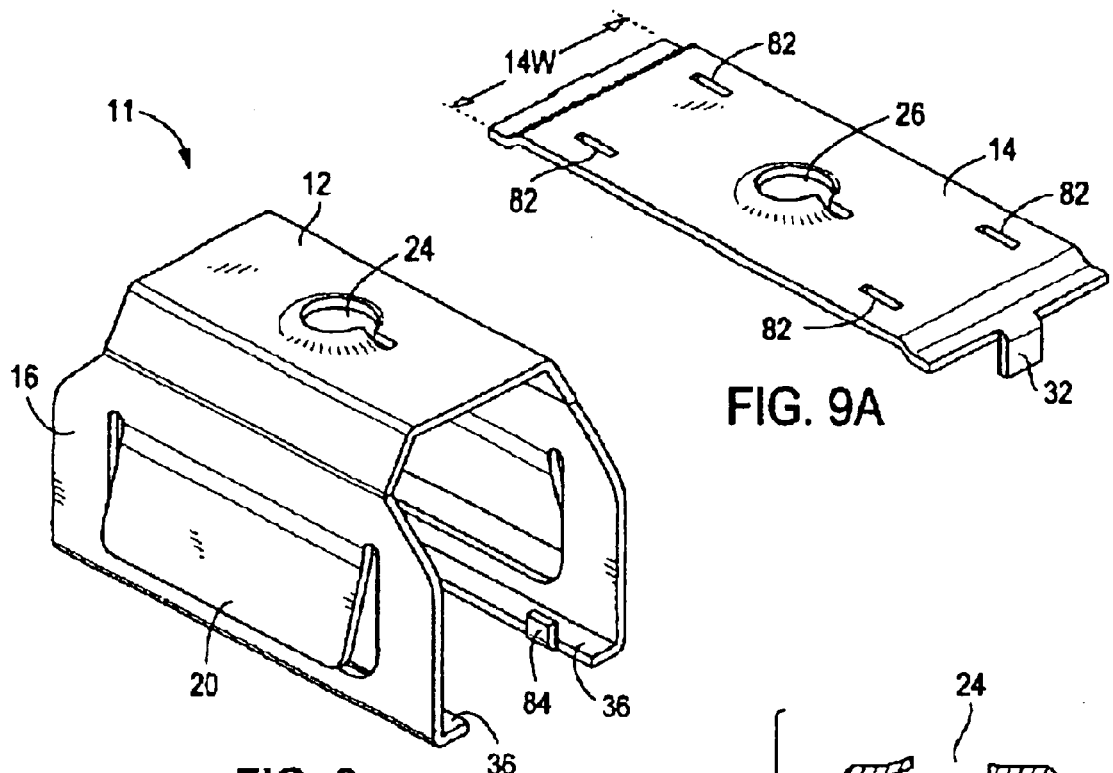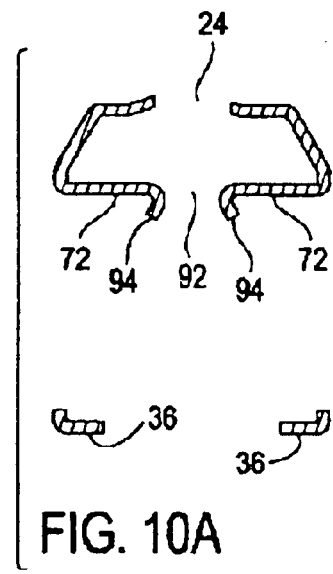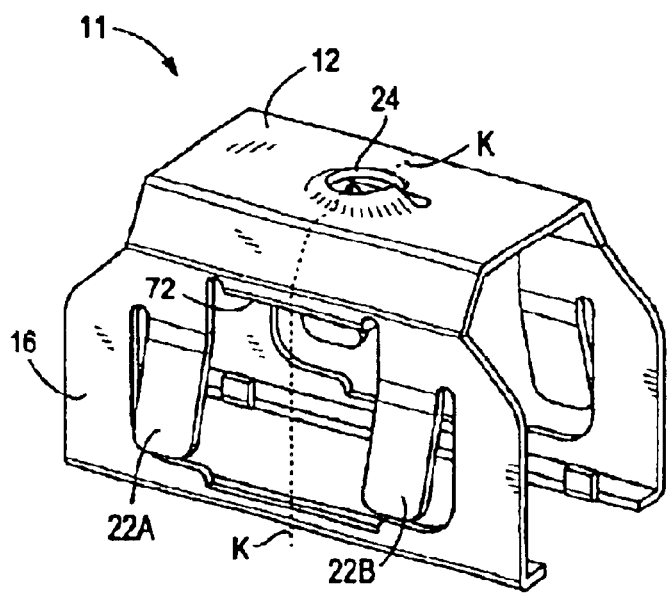

FOLDED SHEET METAL FASTENER

RELATED APPLICATIONS

This non-provisional application Ser. No. 10/607.863 (filed Jun. 27, 2003) is a divisional application of non-provisional application Ser. No. 09/969,563. (filed Oct. 2, 2001), now U.S. Pat. No. 6,627,809 which is incorporated herein by reference in its entirety, and which claims priority of provisional patent application 60/246,634 (filed Nov. 8, 2000), 60/249,996 (filed Nov. 20, 2000), 60/267,281 (filed Feb. 8, 2001), 60/283,266 (filed Apr. 12, 2001), 60/289,343 (filed May 7, 2001), and 60/302,194 (filed Jun. 29, 2001), all six of which are incorporated herein by reference in their entirety.

FIELD OF THE INVENTION

This invention pertains fasteners, and more particularly fasteners which attach one object to another object, with special emphasis to objects in the Automotive Industry.

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult if not impossible for all practical purposes.

The so-called "quick nuts" have also been used to connect two objects. In addition, vibration during the operation of a device, such as an automobile or appliance for example, containing the two objects results very often in loosening of the bolt or "quick nut" and in either full disassembling of the objects from each other, or in a vibration noise which is most annoying and often of unacceptable levels.

Fasteners of the type described in U.S. Pat. No. 4,500,238 (Vassiliou) have been utilized to reduce considerably the potential of bolt or screw loosening and vibration. They have also eliminated the problem of having to place one member of the fastener at the back portion of the hollow object. These fasteners are placed through a slot from the front part of the hollow object. An expanding member, being usually a bolt or a screw, supports the second object by forcing the legs of the fastener (as described for example in U.S. Pat. No. 4,500,238) to open or expand, thereby securing the two objects together. The legs of the fasteners are supported by a double-layered head having an upper side and a lower side joined by side bents. The fasteners of this type have greatly improved the prevailing torque, as well as the pulling force of the system. Prevailing torque is the torque required to render a screw loose. Pulling force is the pulling force applied on the screw to the point of failure, which usually occurs at the bents.

Other references representing the state of the art at this point are disclosed in U.S. Pat. No. 6,629,809, U.S. Pat. Nos. 6,095,734, 5,919,019, 5,636,891, 5,632,584, 5,249,900, 3,486,158, 3,426,817, 2,430,555, 2,376,167, and 2,720,135.

SUMMARY OF THE INVENTION

This invention pertains fasteners, and more particularly fasteners which attach one object to another object, with special emphasis to objects in the Automotive Industry. More particularly, this invention pertains a folded sheet metal fastener comprising:

a top section having a top engageable continuous hole; and a bottom section having a bottom engageable continuous hole, substantially coaxial with the top engageable continuous hole;

the top section and the bottom section being connected by a left section and a right section, the left section comprising a left snapping segment, and the right section comprising a right snapping segment.

Folded sheet metal fastener is an integral piece of folded sheet metal.

The meaning of "substantially coaxial" includes cases that the top engageable continuous hole, and the bottom engageable continuous hole are in a condition selected from deviating from being commensurate, being misaligned, and a combination thereof, as long as they can still by concurrently engaged with the same screw or bolt or other suitable engageable member. In this manner, the prevailing torque is highly improved, even without the need of other frictional elements.

Commensurate engageable holes to a screw or bolt are holes that are positioned at such distance that they both match the pitch of the screw when the holes are concurrently engaged to the same screw or bolt.

Misalignment is deviation from the substantially coaxial status.

Continuous hole, such as any of the engageable holes utilized in the instant invention for example, is a continuous hole on a continuous portion of an object, such as the top section or the bottom section of the fasteners of the present invention for example. An engageable continuous hole provides considerably higher engagement strength than a hole made by two neighboring separated portions of one or more objects (discontinuous hole).

Engageable continuous holes formed on a sheet metal fastener have a helical configuration of the edge of the hole, which helical configuration corresponds to the thread of the screw or bolt to be used in combination with the engageable continuous holes. In some occasions the helical configuration is suitable to fit double threads.

Engageable discontinuous holes are utilized in a number of fasteners, which fasteners have legs forming separate engageable arcs or other types of engageable but separated portions, which separated arcs or separated portions constitute the discontinuous hole. Examples of discontinuous holes are disclosed by Gisondi (U.S. Pat. No. 2,720,135). These discontinuous holes are formed by notches 14 and 15 as well as by notches 17 and 19, as shown in FIGS. 1–6 of U.S. Pat. No. 2,720,135, in contrast with a continuous hole 6 (FIG. 1). In addition, discontinuous holes are the ones through any part of which, a screw or bolt can have no engagement. An example is the apertures 9a and 10a in U.S. Pat. No. 3,426,817.

The bottom section may comprise bottom extensions. Also, the top section is substantially parallel to the bottom section, and has smaller dimensions than said bottom section. The right side section is preferably parallel to the left side section.

The bottom section may comprise an overbent, and the right section may comprise an underbent, the overbent and the underbent overlapping each other in a manner that the overbent is on top of the underbent. The overbent may comprise bottom slots and the underbent may comprise respective tabs, which tabs are passed through the bottom slots, thereby locking the overbent on the underbent. Further, the bottom section may comprise a positioning tab.

The snapping segments may have bents directing part of said snapping segments inwardly.

The fastener may further comprise an under bottom section, the under bottom section being a bent continuation of the right section and comprising an under bottom engageable continuous hole, the under bottom engageable continuous hole being substantially coaxial with the top engageable continuous hole and the bottom engageable continuous hole. The under bottom section may comprise an element selected from under bottom positioning tab, under bottom extensions, and a combination thereof.

Part of the right section may be bent forming an inwardly folded portion, the inwardly folded portion comprising an under top engageable continuous hole, which continuous hole is substantially coaxial with the top engageable continuous hole and the bottom engageable continuous hole. The left section may comprise a support tub on top of the inwardly folded portion.

The left snapping segment may comprise a left side slot, and the right snapping segment may comprise a right side slot.

The top section and the bottom section may comprise more than one set of coaxial engageable continuous holes.

The fasteners of the present invention may further comprise an expansion panel on top of the bottom section, the expansion panel comprising an over bottom engageable continuous hole, the over bottom engageable continuous hole being substantially coaxial with the bottom engageable continuous hole and the top engageable continuous hole.

The present invention further pertains a major portion of a non-integral fastener comprising:
  a top section having a top engageable continuous hole;
  a left side section connected to the top section, comprising a left snapping segment and a left underbent under the left snapping segment; and
  a right section opposite to the left section connected to the top section, comprising a right snapping segment and a right underbent under the right snapping segment.

The side sections may comprise barbs over the underbents and/or the underbents may comprise inclined tabs toward the respective side sections.

The major portion of the sheet metal fastener may further comprise frictional sections which frictionally hinder a screw or bolt passing through said frictional section and the engageable continuous hole from turning.

The present invention also pertains a non-integral fastener comprising:
  a major portion comprising
    a top section having a top engageable continuous hole;
    a left side section connected to the top section, comprising a left snapping segment and a left underbent under the left snapping segment; and
    a right section opposite to the left section connected to the top section, comprising a right snapping segment and a right underbent under the right snapping segment; and
  a bottom section having a bottom engageable continuous hole, substantially coaxial with the top engageable continuous hole, the bottom section disposed on top of the left underbent and the right underbent.

As aforementioned, the side sections may comprise barbs over the underbents and/or the underbents may comprise inclined tabs toward the respective side sections. The major portion of the sheet metal fastener may further comprise frictional sections which frictionally hinder a screw or bolt passing through said frictional section and the engageable continuous hole from turning. The fastener may further comprise frictional sections which frictionally hinder a screw or bolt passing through said frictional section and the engageable continuous hole from turning.

The present invention also pertains a folded sheet metal fastener comprising:
  an upper free-ended top section having an upper top engageable continuous hole;
  a lower free-ended top section having a lower top engageable continuous hole;
  a bottom section having a bottom engageable continuous hole; and
  a left section and a right section;
  the top sections and the bottom section being connected by the left section and the right section, the left section comprising a left snapping segment, and the right section comprising a right snapping segment, wherein the upper top engageable hole, the lower top engageable hole, and the bottom engageable hole are located in positions allowing coexisting engagement by a screw or bolt.

The fastener may further comprise a guiding sector between the bottom engageable continuous hole and the lower top engageable continuous hole for directing the screw or bolt from said bottom engageable continuous hole to said lower top engageable continuous hole.

Preferably, the guiding sector comprises an element selected from guiding sub-sectors leaning against each other, a sub-sector having a non-engageable hole through which the screw or bolt can be guided, a sub-sector having an engageable hole through which the screw or bolt can be guided, an engageable extrusion hole through which the screw or bolt can be guided, a non-engageable extrusion hole through which the screw or bolt can be guided, and a combination thereof.

The guiding sub-sectors leaning against each other may preferably have reinforcing base disposed between said sub-sectors and the bottom section. This is very important for increasing the rigidity of the fastener's structure.

At least one of the snapping segments comprises an anti-opening portion, which dramatically increases the strength by which two or more objects may by held together by the fasteners of this invention, since the anti-opening portions prevent the snapping segments from spreading apart.

In order to considerably improve the insertion of the fastener to a given slot, the upper free-ended top section and the lower free-ended top section should have smaller dimensions than the bottom section.

It is highly preferable that the upper free-ended top section and the lower free-ended top section are just wide enough to accept the upper top engageable continuous hole, and the lower top engageable continuous hole, respectively. This is very important for minimizing the structure of the fastener, and unexpectedly improving its strength, instead of reducing it.

It is highly preferable and critical in many applications that at least two of the upper top engageable continuous hole, the lower top engageable continuous hole, and the bottom engageable continuous hole are in a condition selected from deviating from being commensurate, being misaligned, and a combination thereof. In this manner, the prevailing torque is highly improved, even without the need of other frictional elements.

This invention also pertains any folded sheet metal fastener comprising:

a bottom section having a bottom engageable continuous hole;

a left side section connected to the bottom section and comprising a left snapping segment; and a right side section opposite the left side section also connected to the bottom and comprising a right snapping segment;

wherein at least one of the left and right snapping segments comprise an element selected from an anti-opening portion, an anti-sliding portion and a combination thereof.

Examples of anti-opening and/or anti-sliding portions suitable for the practice of any proper embodiment or other aspect of this invention are given below, and/or disclosed in provisional patent application 60/301,164 (filed Jun. 25, 2001), 60/308,921 (filed Jul. 31, 2001), and 60/312,867 (filed Aug. 16, 2001), all three of which are incorporated herein by reference in their entirety.

The present invention also pertains a combination fastener comprising:

a fastener, the fastener comprising
  a bottom section having a bottom engageable continuous hole, the bottom engageable continuous hole having a helical periphery;
  a left section connected to the bottom and comprising a left snapping segment; and
  a right section also connected to the bottom and comprising a right snapping segment; and
a screw, the screw comprising
  a core, the core having a core surface, and
  a pitch, the pitch being commensurate to the helical periphery of the bottom engageable continuous hole, and wherein the substantial entirety of the helical periphery of the bottom engageable continuous hole substantially contacts the core surface.

The combination fastener may further comprise a top section having a top engageable continuous hole, wherein the top section is connected also to the left section and to the right section.

Further, the combination fastener may further comprise an upper free-ended top section having an upper top engageable continuous hole;

a lower free-ended top section having a lower top engageable continuous hole; and wherein the upper free-ended top section is connected to one of the left and the right side sections and the lower free-ended top section is connected to the remaining of the left and the right side sections.

At least one of the left and right snapping segments may comprise an element selected from an anti-opening portion, an anti-sliding portion and a combination thereof.

This invention is also related to a folded sheet metal fastener comprising:

an upper free-ended top section having an upper top engageable continuous hole;

a lower free-ended top section having a lower top engageable continuous hole;

a bottom section having a bottom engageable continuous hole;

a left section and a right section, the top sections and the bottom section being connected by the left section and the right section; and a front snapping segment and a back snapping segment, wherein at least one of said segments is connected to at least one of the upper free-ended top section and the lower free-ended top section, substantially between the planes of left section and the right section.

Both the front and the back snapping segments may be connected to the lower free-ended top section.

The upper free-ended top section may provide support to the lower free-ended top section.

Both the front and the back snapping segments may be connected, however, to the upper free-ended top section.

The fastener may further comprise side anti-sliding extensions connected to the lower free-ended top section.

This invention also pertains a folded sheet metal fastener comprising:

a top section having a top engageable continuous hole;

a bottom section having a bottom engageable continuous hole;

at least one side section, the top section and the bottom section being connected by the at least one side section; and a front snapping segment and a back snapping segment, the snapping segments connected to the top section.

Further, the fasteners may comprise an elastic body surrounding the bottom section, or being disposed in the vicinity of the bottom section. Thus, when water-proofing, and/or gas-proofing are desired for a particular application, and/or vibration noises are to be prevented, or for any other reason, an elastic body is incorporated in the vicinity of the bottom section. It may be integrally molded at least at the lower side of the bottom section, or around the whole bottom section. Such elastic bodies include, but are not limited to plastisols, polyurethanes, silicones, thermoplastic elastomers, etc. Some examples of such polymers are disclosed in U.S. Pat. No. 5,725,343 (Smith), and in the patent application of Kanubhai Manibhai Patel, Michael Walter Smith and Edward John Smith having a Ser. No. 09/561,505, filed on Apr. 28, 2000, and which patent and patent application are incorporated herein by reference in their entirety.

As aforementioned, the fasteners of the present invention may comprise an elastic body. The elastic body may be attached to or molded at least under the bottom section of the sheet metal fastener, the elastic body having an upper side, a lower side, and an edge. The fastener may comprise holders embedded into the elastic body.

The elastic body may comprise sealing rims at least on one of the upper and lower side of said elastic body.

When the elastic body comprises sealing rims on both the upper side and the lower side of the elastic body, it is preferable that the sealing rims on the upper side of the elastic body are arranged to be in alternate positions with respect to the sealing rims on the lower side of the elastic body.

Also, one of the sealing rims on the top side of the elastic body is closest to the edge of the elastic body than any other sealing rim at the lower side of the elastic body.

The elastic body may further comprises a screw sealing portion in the vicinity of the bottom engageable continuous hole.

This invention also pertains fasteners wherein the snapping segments comprise a bent, and the anti-sliding portions comprise an element selected from extension of the snapping segment, barbs on the bent, ridges on the bent, knurls on the bent, and a combination thereof.

In addition, this invention is related to folded sheet metal fasteners comprising:

an upper free-ended top section having an upper top engageable continuous hole;

a lower free-ended top section having a lower top hole;

a bottom section having a bottom engageable continuous hole; and a left section and a right section;

the top sections and the bottom section being connected by the left section and the right section, the left section comprising a left snapping segment, and the right section comprising a right snapping segment, wherein the upper top engageable hole, the lower top hole, and the bottom engageable hole are located in positions allowing coexisting engagement by a screw or bolt.

As in all other cases, the snapping segments may comprise a bent having a portion selected from anti-opening portion, anti-sliding portion and a combination thereof, the anti-sliding portion comprising an element selected from extension of the snapping segment, barbs on the bent, ridges on the bent, knurls on the bent, and a combination thereof.

Depending on the application, one or more configurations described above are critical. Examples of such criticalities are described in the detailed description of this invention.

The fastener may be connected first to a given element, and the assembly of the two be attached to a second element, or vice versa. Of course, more than two elements may be connected together by the fasteners of the present invention.

The present invention also pertains vehicles comprising parts or elements connected with the fasteners and combination fasteners, as well as the major portion of such fasteners, as disclosed and claimed herein. The parts or elements of the vehicle, of course, have to be commensurate to the fastener, as shown for example in FIG. 1G.

BRIEF DESCRIPTION OF THE DRAWING

The reader's understanding of this invention will be enhanced by reference to the following detailed description taken in combination with the drawing figures, wherein:

FIG. 1 is a perspective view of a folded sheet metal fastener 10 comprising two engageable continuous holes 24 and 26 according to a preferred embodiment of the instant invention, wherein the bottom section 14 has an overbent 34, and the right section 18 has an underbent 36, overlapping each other.

FIG. 1A represents an unfolded version of the fastener of FIG. 1.

FIG. 1B is a cross sectional view of the fastener of FIG. 1 across line X1—X1 of FIG. 1A.

FIG. 5 is a perspective view of a fastener 10 according to another preferred embodiment of the present invention, wherein slots 78 and 80 are provided within the regions of the snapping segments 16 and 18, respectively, in order to increase flexibility of said segments, among other attributes. Further, there are provided engageable slots 82 at the overbent 34 of the bottom section 14 and tabs 84 at the underbent 36 of the right section 18, thus resulting in a stronger configuration.

FIG. 5A represents an unfolded version of the fastener of FIG. 5.

FIG. 6 is a perspective view of a fastener 10 according to another preferred embodiment of the present invention, wherein two sets of coaxial engageable continuous holes 24A–26A and 24B–26B are present.

FIG. 6A represents an unfolded version of the fastener of FIG. 6.

FIG. 7A is a stamped blank of the fastener according to another preferred embodiment of the present invention, wherein an expansion panel 86 is folded over the bottom section 14 and provides an additional engageable continuous hole 29. A support section 88 prevents movement of the free edge of the panel 29 from moving in a direction from the bottom section 14 toward the top section 12, thus increasing strength of the configuration.

FIG. 7B is a cross sectional view of the fastener of FIG. 7A across line Y1—Y1 of FIG. 7A.

FIG. 7C is a cross sectional view of a fastener similar to that of FIG. 7A (across line Y1—Y1 of FIG. 7A), with the difference that the bottom section 14 is surrounded by an elastic body.

FIG. 8 is a perspective view of a major portion of a non-integral fastener which comprises underbents under the side sections and inwardly directed barbs on the side sections to secure the bottom section between the underbents and the barbs.

FIG. 8A is a perspective view of a separate bottom section, which when assembled with the major portion of FIG. 8, forms a full fastener according to the instant invention.

FIG. 9 is a perspective view of a major portion of a fastener which comprises underbents under the side sections and inclined tabs on said underbents to secure the bottom section.

FIG. 9A is a perspective view of a separate bottom section, which has bottom slots respective to the inclined tabs of the underbents of FIG. 9, and which bottom section when assembled with the major portion of FIG. 9, forms a full fastener according to the instant invention.

FIG. 10 is a perspective view of a major portion of a fastener which comprises underbents under the side sections and an inwardly folded portion for frictional improvement of the prevailing torque.

FIG. 10A is a cross-sectional view of a major portion of the fastener of FIG. 10 through line K—K.

FIG. 25 is a fragmental side-view of a snapping segment with an inwardly bent portion provided with ridges.

DETAILED DESCRIPTION OF THE INVENTION

Figure 1C:
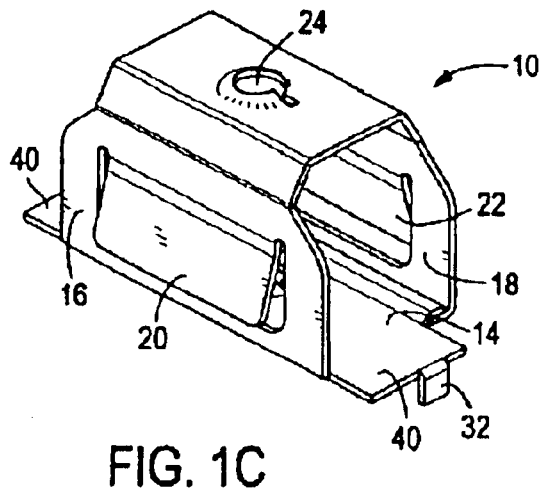
FIG. 1C is a perspective view of a fastener 10 according to another preferred embodiment of the present invention, wherein the bottom section 14 is provided with bottom section extensions 40.

As aforementioned, this invention pertains fasteners, and more particularly fasteners which attach one object to another object, with special emphasis to objects in the Automotive Industry.

As also mentioned earlier, there is a need to have one or more fasteners attached to a large first object, such as a headliner of a car for example, and then attach this large first object to second object, such as the inside of the roof of a car for example, by inserting at least part of the fastener into the second object, through a slot for example. An additional requirement many times is to use a rather light force for the insertion, but to require an extraordinarily high force to separate the two objects, if the fastener is not first removed, by unthreading for example a bolt or a screw which attaches the fastener to the first object. A further requirement in many occasions is that after unthreading the bolt or screw, the fastener remains attached to the second object. In other occasions, however, it is required that the two objects are separated by pulling one object away from the other object, without performing other action, such as unthreading a screw or a bolt. Another requirement in a plurality of application is that the fastener has to be attached to a specified position on the first object, and not allowed to turn. The configuration should be such that the screw or bolt could hold additional object(s), such as a car handle for example.

This invention provides fasteners which have the configurations required to satisfy the above need.

Referring now to FIG. 1, there is depicted a folded sheet metal fastener 10 according to this invention. The fastener 10 comprises a top section 12, a bottom section 14, a left section 16, and a right section 18. The left section 16 comprises an outwardly bent left snapping segment 20, and the right section 18 comprises an outwardly bent right snapping segment 22. The left snapping segment 20 has an edge 20', and the right snapping segment has an edge 22'.

It is of utmost importance that the top section 12 has smaller dimensions than the bottom section 14 for insertion into a slot, as it will be explained later in more detail. The top section 12 and the bottom section 14 are preferably integrally connected with a size reducing left sector 28 and a size reducing right sector 30. The top portion further comprises an engageable (with respect to a screw, or a bold, or the like) continuous hole 24, and the bottom further comprises an engageable continuous hole 26. The bottom section 14 also comprises at least one positioning tab 32. In order to achieve a strong structure, it is important that the right section 18 is extended to an underbent 36, and the bottom section 14 provides an overbent 34, which bents overlap each other.

The fastener illustrated in FIG. 1 may be formed by folding the stamped sheet metal piece, as the one shown in FIG. 1A, around bending lines 38. The folding or bending at the region of each line 38 is preferably in the form of a gradual curve rather than in the form of a sharp bent.

A cross section of the folded sheet metal fastener at the length of line X1—X1 (FIG. 1A) is shown in FIG. 1B.

The top section 12 of the fastener is preferably substantially parallel to the bottom section 14, and the left section 16 is preferably substantially parallel to the right section 18.

In a large number of applications, it is critical for the fastener of the instant invention to comprise one or more extended bottom sections. Examples of extended bottom sections are extensions 40 of the bottom section 14 as shown in FIG. 1C, extensions 42 of the bottom section 14 as shown in FIG. 1D, and extensions 44 of the bottom section 14 as shown in FIG. 1E.

Figure 1D:
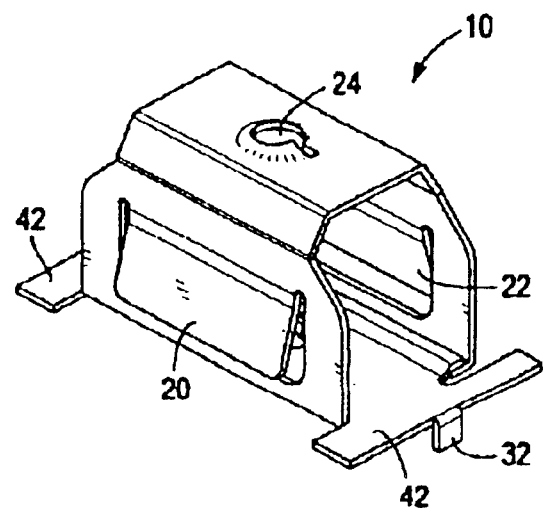
FIG. 1D is a perspective view of a fastener 10 comprising two engageable continuous holes 24 and 26 according to another preferred embodiment of the present invention, wherein the bottom section 14 is provided with a different version of bottom section extensions 42 as compared to the ones shown in FIG. 1C.
Figure 1E:
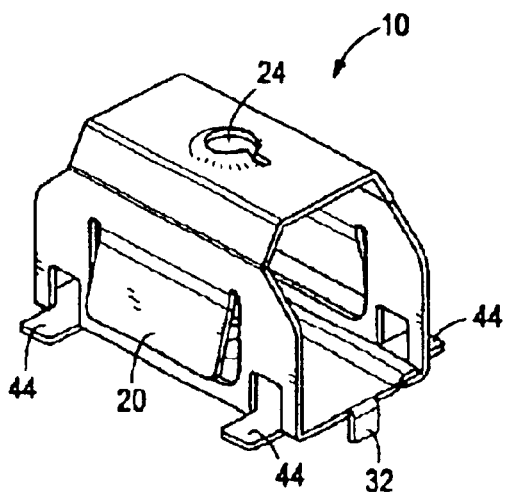
FIG. 1E is a perspective view of a fastener 10 comprising two engageable continuous holes 24 and 26 according to another preferred embodiment of the present invention, wherein the bottom section 14 is provided with a different version of bottom section extensions 44 as compared to the ones shown in FIGS. 1C and 1D.
Figure 1F:
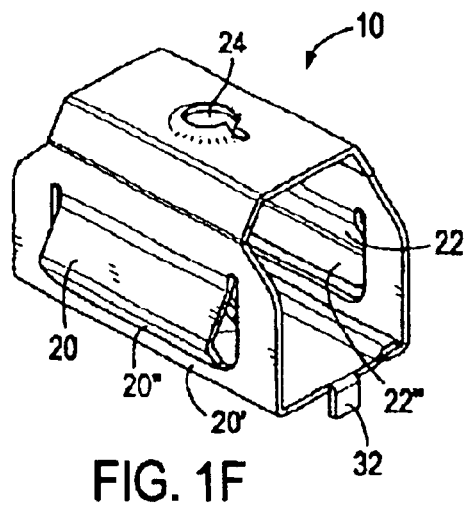
FIG. 1F is a perspective view of a fastener 10 comprising two engageable continuous holes 24 and 26 according to another preferred embodiment of the present invention, wherein the snapping segments 20 and 22 have bents 20" and 22".

On the other hand, in other applications, it is critical for the left snapping segment 20 and the right snapping segment 22 to have inwardly bent portions 20" and 22", as better shown in FIG. 1F.

The folded sheet metal fasteners in FIG. 1, as well as in FIGS. 2 to 7C have been shown in just their basic form without extensions of the bottom section or bent portions of the snapping segments for purposes of clarity and brevity, but it should be understood that any of the embodiments of this invention may comprise such features.

Figure 1G:
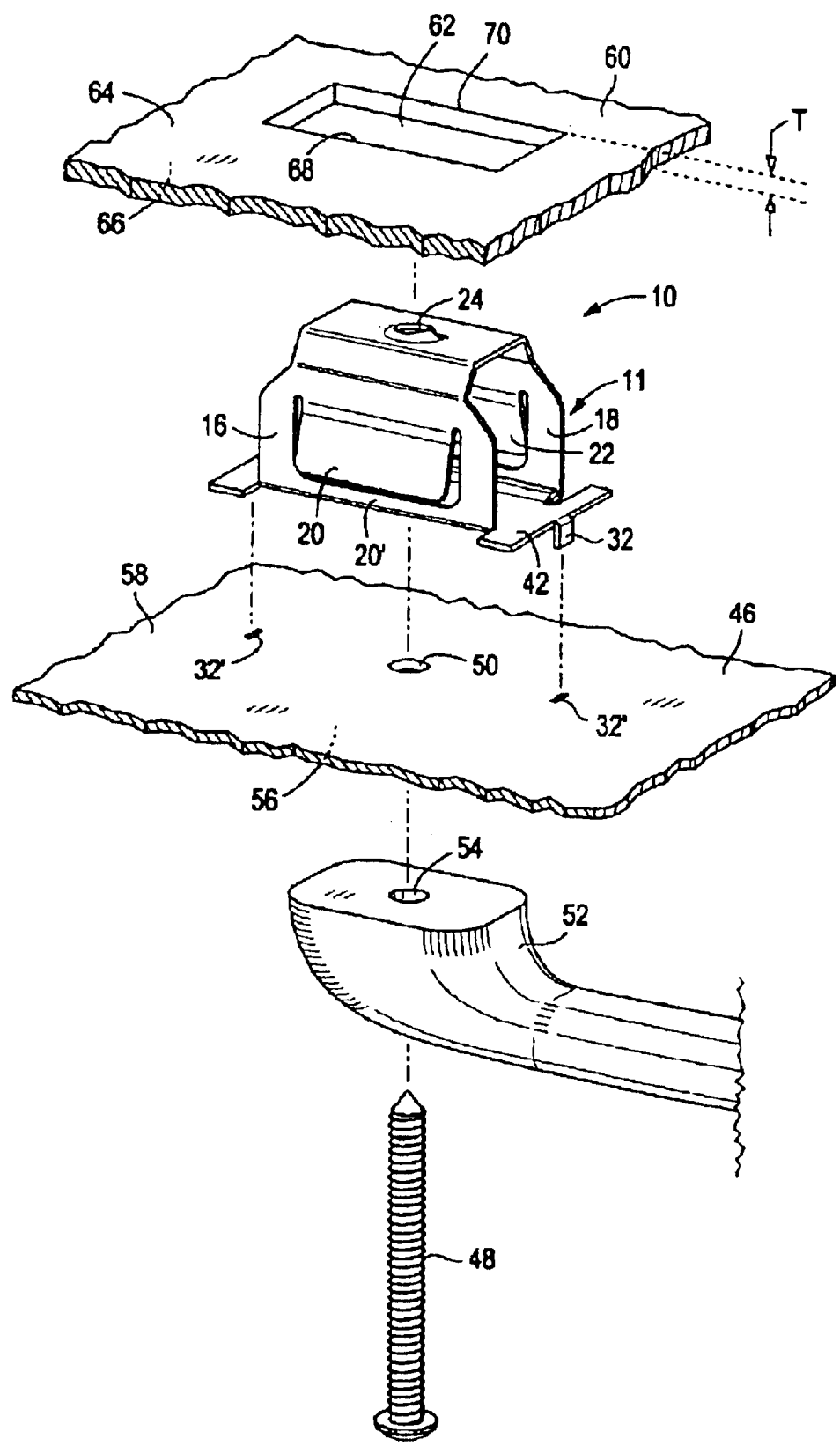
FIG. 1G is a fragmental perspective view of an arrangement demonstrating the operation of a fastener according to the instant invention.

In operation, as better illustrated in FIG. 1G, one of the fasteners of FIGS. 1 to 1E, for example the fastener 10 of FIG. 1D, is secured on a first object 46, such as a headliner for example, by passing a screw or bolt 48 through hole 50 of the first object 46, and threading said screw or bolt 48 on engageable continuous holes 26 and 24 of the bottom section 14 and the top section 12, respectively. A third object, such as a handle 52 for example, may be secured by the same screw or bolt by passing said screw or bolt through a hole 54 belonging to the third object. More than one fasteners may be secured on the first object 46. Such combinations form an assembly, such as a headliner assembly for example.

During securing the fastener 10 on the first object 46, care is taken to align the fastener in a predetermined position, by inserting positioning tabs 32 of the fastener 10 into respective recesses or slots 32' of the first object 46 (or respective recesses or slots on the additional object). Although the hole 50 and just one positioning tab 32 is adequate for placing the fastener 10 to the predetermined position, more accuracy is achieved by utilizing more than one positioning tabs 32 and respective recesses or slots 32' (or respective recesses or slots on the additional object).

The assembly, such as a headliner assembly for example, which usually comprises more than one secured and aligned fasteners 10 in predetermined directions, is pushed by the operator against a metal sheet 60, which can be in the form of a framework in the vicinity of the ceiling of the inside region of a vehicle for example. Other material may replace, however, the metal, and it should be understood throughout this disclosure that when referring to metal sheet, any other suitable material may replace the metal, or any other object or combination of objects may replace the sheet.

The metal sheet 60 has slot 62, an upper side 64, and a lower side 66. The slot 62 has such dimensions and direction as to accept the body 11 of the fastener 10 preferably rather tight, but not as tight as not to allow small misalignments. The important function of the fastener configuration which involves smaller dimensions of the top section 12 as compared to the dimensions of the bottom section 14, is absolutely critical in most occasions, where more than one fasteners are used, in achieving insertion in the case of such small misalignments.

As the body 11 of the fastener 10 is being pushed through the slot 62, the snapping segments 20 and 22 are also inwardly pushed until they reach a position substantially at the same plane as the plane of the left section 16 and the right section 18, respectively, and finally, when the body 11 of the fastener 10 has reached its final position, the snapping segments 20 and 22 snap back, the edges 20' and 22' position themselves on the top side 64 of the metal sheet 60, and thus, they lock the fastener 10, as well as the whole assembly, onto the metal sheet 60.

The distance of the edges 20' and 22' from the extension 42 should be substantially the same as the thickness 60T of the metal sheet 60 if the angle formed by the left and right sections with the respective snapping segments is minimal, and accordingly larger if said angle is rather large, so that the fastener can be completely inserted and allow the snapping segments to snap back, without leaving too much play between the fastener and the sheet metal after locking. The length of the snapping segments should also be taken into account for this procedure. An elastic body surrounding the bottom section 14, as it will be discussed later, corrects any play between the fastener and the sheet metal after locking.

A number of parameters determine the force needed to insert the assembly into the slot 62. These include but are not limited to the thickness, hardness and spring characteristics of the folded sheet metal from which the fastener is made, the shape and dimensions of the fastener, the length and width of the snapping segments, the angle formed by the left and right sections with the respective snapping segments, the dimensions of the slot 62, etc. For each particular application, these parameters may be determined experimentally, or by engineering calculations, or a combination thereof without undue effort.

The force to separate the assembly from the metal sheet 60 is manifold higher than the insertion force, due to the critical configurations of the instant invention, and it depends on the above parameters, but also on the characteristics of the screw or bolt 48, the characteristics of the engageable continuous holes or other engageable elements of the fastener, etc. The multiplicity of engageable continuous holes, as well as the other features of the fastener of the present invention, are critical in considerably increasing the ratio of the separating force to the insertion force.

The utilization of more than one engageable continuous holes is critical not only for adequately strong attachment of the fastener 10 to the first object, directly or indirectly, in a manner to form an assembly, but also to combine very easy insertion of the fastener into the slot 62 of the metal sheet 60 with extremely difficult separation of the assembly from the metal sheet after the easy insertion has taken place. The importance of adequately strong attachment, despite the easy insertion, becomes even more critical when a larger number of objects, and/or more demanding objects have to be supported by the fastener 10 on either one or both lower side 56 and upper side 58 of the first object 46. Especially in the case that a given additional object (not shown for purposes of clarity), such as an air-bag system for example, has to be attached to the upper side 58 of the first object, then the fastener may be secured on said additional item, so that the additional object is sandwiched and secured between the fastener 10 and the first object 46, thus forming an assembly, such as a headliner assembly for example.

If service is needed, and partial or total removal of the assembly of elements from the metal sheet 60 is needed, the screw(s) or bolt(s) 48 are unthreaded, and the assembly is freed from the metal sheet 60, with the fastener, however, attached now to the metal sheet 60. After the service, the elements may be attached in their initial position by using the screw or bolt 48 as shown in FIG. 1G.

In a different embodiment of the instant invention, better shown in FIG. 1F, the snapping segments of the fastener 10 comprise bents 20" and 22", which bents direct part of the snapping segments inwardly.

The operation of this embodiment is similar to the operation of the above embodiment, with the difference that the dimensions of the slot 62 (FIG. 1G) and of the snapping segments are designed to be such that after complete insertion of the fastener 10 into the slot, the edges 20' and 22' (not shown), respectively, do not go through the slot. Thus, the engagement of the fastener takes place on the edge 68 of the slot 62 and the region of the snapping segments between the bent 20" and the edge 20', as well as on the edge 70 of the slot 62 and the region of the snapping segments between the bent 22" and the edge 22'.

In this case, the assembly may be pulled away from the metal sheet without unthreatening the screw or bolt 48. If the option of unthreatening the screw or bolt is desirable, extensions of the bottom section 14, such as extensions 40, 42, or 44, shown in FIGS. 1C, 1D, and 1E, respectively should be advisable.

Of course, it may be desirable for some applications to design the dimensions of the slot 62 and the snapping segments 20 and 22 to be such that the edges 20' and 22' go completely through the slot 62 upon insertion of the fastener. In such a case, the operation is exactly as that of the embodiment shown in FIG. 1.

It is important to note that in all embodiments of the present invention, extensions such as extensions 40, 42, or 44, shown in FIGS. 1C, 1D, and 1E are critically necessary for certain applications, but not necessary for other applications. However, in many of the embodiments, extensions are not shown for purposes of clarity and brevity.

Figure 2:
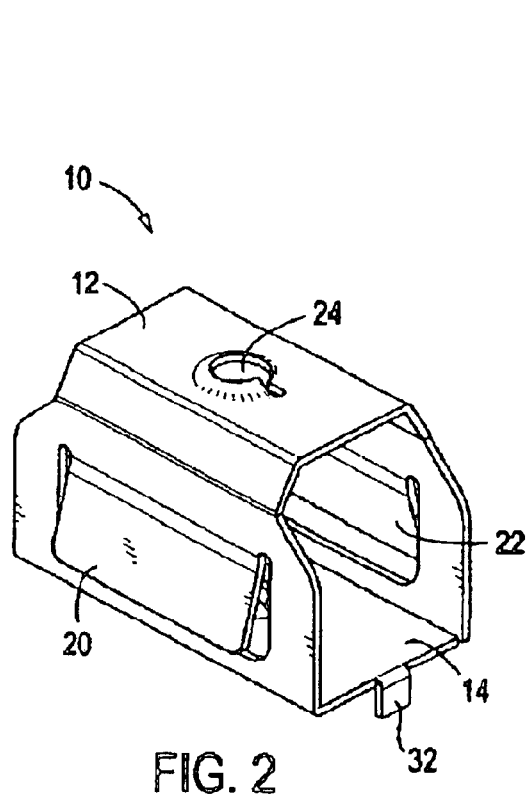
FIG. 2 is a perspective view of a fastener 10 comprising two engageable continuous holes 24 and 26 according to another preferred embodiment of the present invention, wherein the bottom section 14 lacks the overbent, and the right section lacks the underbent shown in FIG. 1.

In a different embodiment of the instant invention, better shown in FIG. 2, there is depicted a fastener, which is similar to that of the fastener illustrated in FIG. 1, with the difference that the overbent 34 and the underbent 36 are missing. The fastener of FIG. 2 has a simpler configuration, but it is still suitable for certain applications, which do not need as high as pulling strength as the fastener of FIG. 1 provides.

Figure 2A:
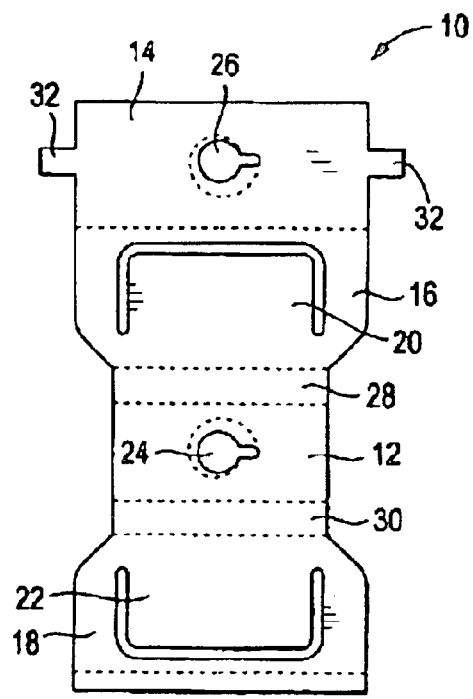
FIG. 2A represents an unfolded version of the fastener of FIG. 2.

The unfolded blank to make the fastener of FIG. 2 is shown in FIG. 2A.

The operation of this embodiment is substantially the same as that of the embodiment of FIG. 1.

Figure 3:
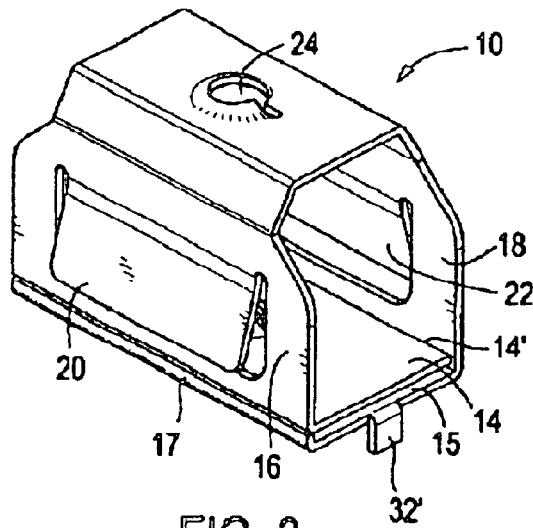
FIG. 3 is a perspective view of a fastener 10 according to another preferred embodiment of the present invention, wherein the fastener 10 comprises an under bottom section 15 disposed under the bottom section 14, thus providing the fastener 10 with three engageable continuous holes 24, 25, and 26.
Figure 3A:
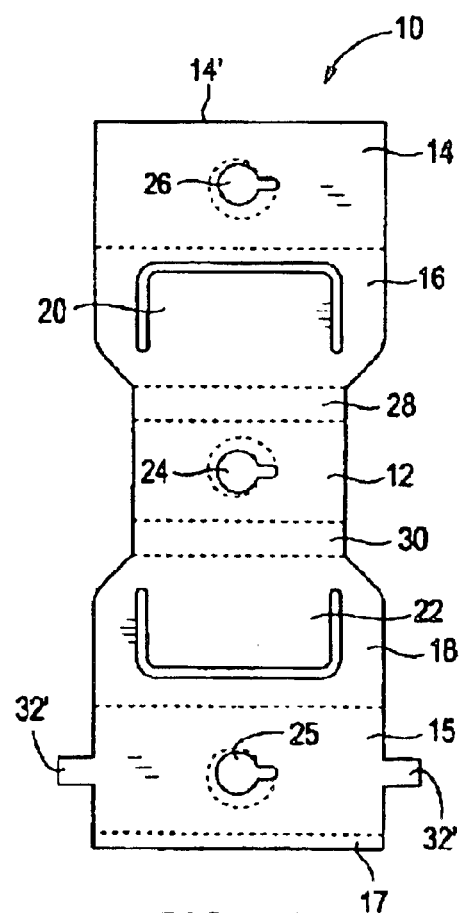
FIG. 3A represents an unfolded version of the fastener of FIG. 3.

In another embodiment of the present invention, better shown in FIG. 3, there is depicted a fastener, part of which is similar to the fastener shown in FIG. 2, but which fastener comprises also an under bottom section 15. The unfolded blank of the fastener of FIG. 3 is shown in FIG. 3A.

The under bottom section 15 comprises an additional engageable continuous hole 25, a side bent 17, and positioning tabs 32'.

The additional engageable continuous hole 25 provides even higher strength to the structure of the fastener, and greatly increases the separation force during operation. Further increase in separation force may be achieved by forming inwardly directed protrusion(s) (not shown) or support tab(s) (not shown) on the side section 18, just over the edge 14 (FIG. 3), which protrusion or tab(s) hinder movement of edge 14' in a direction from the bottom section 14 toward the top section 12.

The operation of this embodiment is substantially the same as that of the embodiment of FIG. 1.

Figure 4:
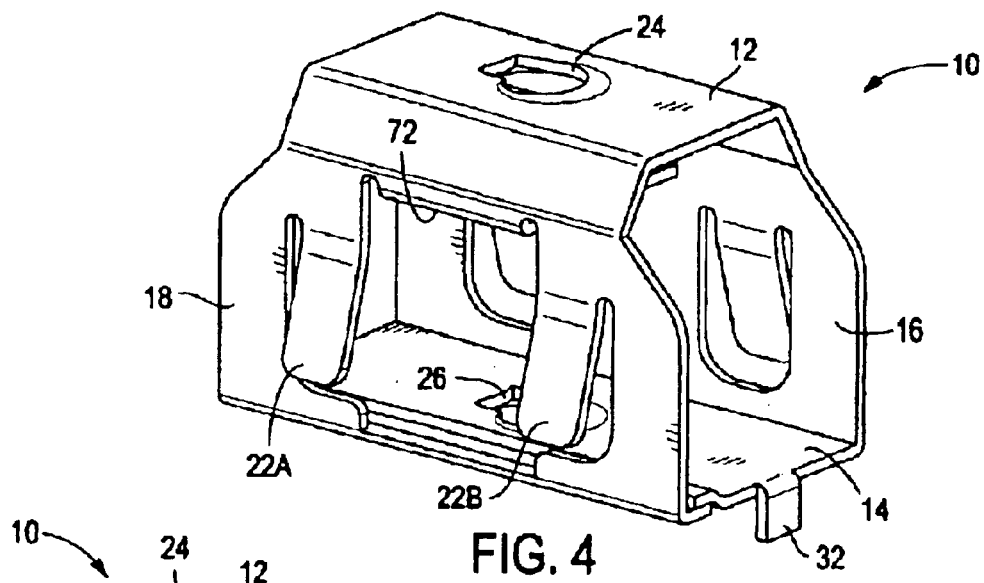
FIG. 4 is a perspective view of a fastener 10 according to another preferred embodiment of the present invention, wherein a central part 72 of the right snapping segment 18 has been bent to form an inwardly folded portion 72, which provides the fastener with a third engageable continuous hole 27.
Figure 4B:
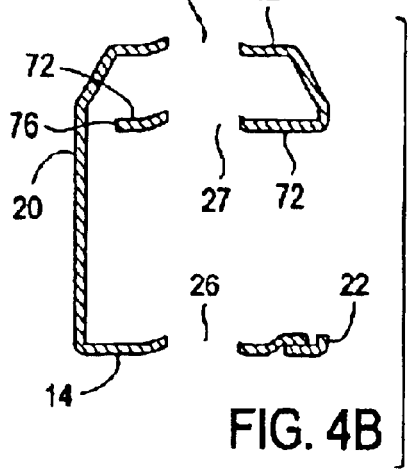
FIG. 4B is a cross sectional view of the fastener of FIG. 4 across line X2—X2 of FIG. 4A.
Figure 4C:
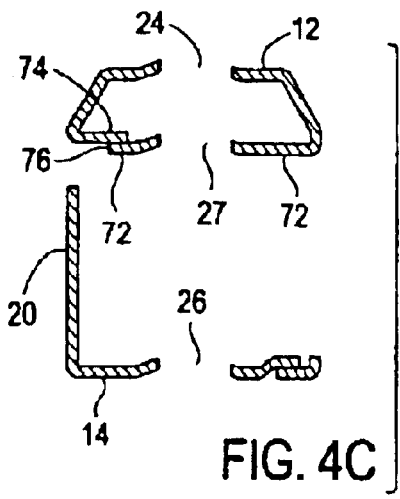
FIG. 4C is a cross sectional view of a fastener 10 according to another preferred embodiment of the present invention, which fastener is similar to the one shown in FIGS. 4, 4A, and 4B, with the difference that a support tab 74 is located on the left section 16 at the height of and just above the inwardly bent portion 72 shown in FIG. 4, thus preventing said bent portion 72 from moving in a direction form the bottom section 14 toward the top section 12.
Figure 4A:
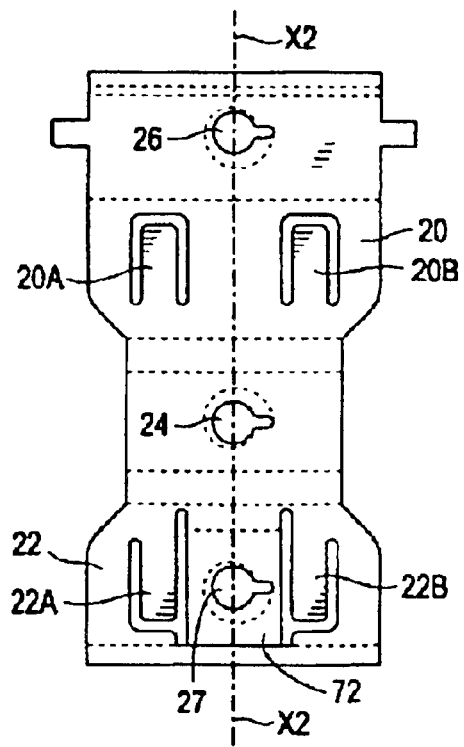
FIG. 4A represents an unfolded version of the fastener of FIG. 4.

Still another embodiment is illustrated in FIGS. 4, 4A and 4B. FIG. 4 is a perspective view of a fastener according to this embodiment. FIG. 4 is a perspective view of the fastener of this embodiment, while FIG. 4A illustrates a blank of the fastener before folding it into its final shape. FIG. 4B is a cross section of the final fastener through line X2—X2 of FIG. 4A.

This fastener has a portion 72 of the right section 22 folded inwardly under the top section 12. Portion 72 also has an under top engageable continuous hole 27. Needless to say that all three engageable continuous holes 24, 26, and 27 are substantially coaxial.

The additional engageable continuous hole 27 provides even higher strength to the structure of the fastener, and greatly increases the separation force during operation, as do additional continuous holes in other embodiments. Further increase in separation force may be achieved by forming inwardly directed protrusion(s) or support tab(s) (FIG. 4C) on the side section 20, just over the edge 76 of the portion 72, which protrusion or tab(s) hinder movement of edge 76 in a direction from the bottom section 14 toward the top section 12, and therefore, they render the structure considerably more sturdy.

The presence of the folded portion 72 necessitates the formation of two snapping segments 22A and 22B on the right section 18.

For purposes of uniformity, two snapping sections 20A and 20B are also formed on the left section 16, without this to be a necessary condition.

The operation of this embodiment is substantially the same as the embodiment of FIG. 1, with the difference than three engageable continuous holes are engaged after threading the screw or bolt through them, thus attaching one or more items together in a manner to form an assembly, which as a whole may be snapped and attached onto another item having a slot.

It should be noted, however, that the fasteners of the instant invention may be first snapped and attached onto an item having a slot, and then one ore more other items may be supported on the same fastener by means of a screw or a bolt passing through said items and threaded onto the engageable continuous holes.

A fastener according to another embodiment of the instant invention is shown in FIG. 5. A blank of the fastener before folding is shown in FIG. 5A.

According to this embodiment, there is provided a left side slot 78, and a right side slot 80. One purpose of the slots is to increase the flexibility of the snapping segments 20 and 22. The size, width and length of the slots can vary according to the application and the degree of flexibility increase required.

There are also provided bottom slots 82 and respective tabs 84, which tabs are inserted into the bottom slots 82 upon folding the blank (FIG. 5A) to form the final fastener (FIG. 5). This combination provides stronger structure to the fastener.

The operation of this embodiment is substantially the same as the embodiment of FIG. 1, with the difference that the side slots provide higher flexibility of the snapping segments 20 and 22, and that the combination of the tabs 84 with the bottom slots 82 provides stronger structure to the fastener.

A fastener according to another embodiment of the instant invention is shown in FIG. 6. A blank of the fastener before folding is shown in FIG. 6A.

This fastener is similar to the one shown in FIG. 1, with a difference that instead of one top engageable continuous hole 24 there are two top engageable continuous holes 24A and 24B with respective bottom engageable continuous holes 26A and 26B. Engageable continuous holes 24A and 26A are substantially coaxial, and engageable continuous holes 24B and 26B are also coaxial. It is evident that even more than two sets of coaxial continuous holes may be utilized. Another difference is the presence of bottom slots 82 in combination with tabs 84, as described in the previous embodiment. A positioning tab, such as tab 32 in FIG. 1 is not necessary since the two sets of continuous holes are adequate to place the fastener in a predetermined position.

The operation of this embodiment is substantially the same as the embodiment of FIG. 1, with the main difference that two sets of engageable continuous holes are provided in this embodiment, thus requiring two screws or bolts, and therefore, providing considerably higher strength to the structure.

The blank of a fastener before folding, according to still another embodiment of the instant invention, is shown in FIG. 7. A cross section through line Y1—Y1 is shown in FIG. 6A, while a cross section through line X3—X3 is substantially the same as the one shown in FIG. 1B.

According to this embodiment, there is provided an expansion panel 86, which comprises an over bottom engageable continuous hole 29. When the expansion panel 86 is folded inwardly as shown in FIG. 7B, the engageable continuous hole 29 is positioned in a manner to be coaxial with engageable continuous holes 26 and 24 (see also FIG. 1B). The expansion panel 86 is supported by support section 88.

The operation of this embodiment is substantially the same as the embodiment of FIG. 1, with the difference than three engageable continuous holes are engaged after threading the screw or bolt through them, thus attaching one or more items together in a manner to form an assembly, which as a whole may be snapped and attached onto another item having a slot. This configuration provides a considerably stronger structure.

As also mentioned earlier, when water-proofing, and/or gas-proofing are desired for a particular application, and/or vibration noises are to be prevented, an elastic body is preferably integrally molded at least at the lower side of the bottom section, and preferably around the whole bottom section. Such elastic bodies include, but are not limited to plastisols, polyurethanes, silicones, thermoplastic elastomers, etc. Some examples of such polymers are disclosed in U.S. Pat. No. 5,725,343 (Smith), and in the patent application of Kanubhai Manibhai Patel, Michael Walter Smith and Edward John Smith having a Ser. No. 09/561,505, filed on Apr. 28, 2000, and which patent and patent application are incorporated herein by reference in their entirety.

An example of such a configuration is shown in FIG. 7C, which corresponds to a fastener illustrated in FIGS. 7A and 7B, the bottom section 14 of which has been surrounded by an elastic body 90. Preferably, the elastic body has an impression 92, which is substantially coaxial with the engageable continuous holes 26, 29, and 24.

The operation of this embodiment is substantially the same as that of the previous embodiment, with the difference that when the assembly is snapped onto the metal sheet 60 (see FIG. 1G), the elastic body 90 covers the slot 62 completely and pushes against the lower side of the metal sheet 60 around the slot. This provides water proofing and gas proofing between the two sides 64 and 66 of the metal sheet 60. In addition, it provides cushioning, which eliminates squeaking noises.

In still another embodiment of the present invention, the bottom section 14 is a separate (non-integral) part from the major portion 11 of the fastener, as better shown in FIGS. 8 and 8A. The full fastener is preferably assembled first before its use by combining the bottom section 14 with the major portion 11, as discussed below. This type of fastener has a number of advantages, as compared to the fasteners of the previous embodiments. Among these advantages is the fact that it is easier to be manufactured, and also, the fact that it may be used for different thicknesses of the metal sheet 60 (see FIG. 1G), by just changing the bottom section 14, without affecting the major portion 11, as it will be discussed in more detail later. Further, the major portion 11 may have different thickness than the separate bottom section 17, thus providing considerably higher freedom in designing the structural characteristics of the fastener.

The major portion 11 comprises underbents 36, which underbents have a width 36W and a length 36L. Although in FIG. 8, the length 36L of the underbents 36 is shown to be substantially equal to the length 16L of the side sections 16 and 18, in practice it is preferable to be somewhat smaller the length 16L, in a manner that the extensions 40 (FIG. 8A), after the fastener has been assembled, come out of the edges 16i and 18i, at the level of the underbents 36, provided of course, that the length 14L of the bottom section 14 is substantially equal to the length 36L of the underbents 36. The side portions 16 and 18 comprise inwardly directed barbs 13, which can hold the bottom section 14 within the gap formed between said barbs 13 and the underbents 36. Preferably, this gap is substantially equal to the thickness 14T of the bottom section 14. The thickness 14T may be the substantially same or different than the thickness of the sheet metal from which the major portion 11 of the fastener has been made. Further, the width 36W of the underbents 36 may vary widely, provided that there is allowed adequate space for the screw or bolt 48 (see FIG. 1G) to pass through. In case that the width 36W of the underbents 36 is very large, a hole of adequate diameter, being substantially coaxial with the hole 24 may be provided to the underbents.

The width 14W of the bottom section 14 should be preferably substantially equal to the distance separating the side sections 16 and 18, when said sections are in parallel position to each other and perpendicular to the top section 12.

In this embodiment, for practical purposes, it is important that the major portion 11 of the fastener, which in most occasions is made of steel which is hardened in order to get springiness among other attributes, is shaped in a manner that the distance between the two side sections 16 and 18 is smaller at the portion close to the underbents 36, as compared to the distance between said side sections 16 and 18 close to the top section 12.

Thus, in assembling the fastener, the bottom section 14 is is inserted within the structure formed by the side sections 16 and 18, and the top section 12 in a generally diagonal position, so that one side of the bottom section 14 is inserted between the barbs 13 and the underbent 36 of one side section (side section 18 for example), and the other side of the bottom section 14 has a general position toward the top section 12. In sequence, the side which has a general position toward the top section 12 is forced to slide toward the underbent 36 of the other side section (side section 16 for example), until it snaps between the barbs and the respective underbent of this side section (side section 16 for example). The springiness of the major portion 11 (which tends to decrease the distance between the two side sections 16 and 18 in the vicinity of the underbents 36) of the fastener holds securely the bottom 14 in its position. Of course, care is taken to position the underbents 36 along the length 14L of the bottom section 14, so that the engageable continuous hole 26 is coaxial with the respective engageable continuous hole 24, and so that the extensions 40 extend beyond the edges 16i and 18i at the same level as the underbents 36.

Further, in the fully assembled fastener, due to the springiness of the sheet metal, the side sections 16 and 18 may become substantially parallel to each other, and the top section 12 becomes substantially parallel to the bottom section 14. Further, the side sections 16 and 18 may become substantially perpendicular to the top section 12 and to the bottom section 14. For structural integrity, it is important that the side sections 16 and 18 are integrally connected to the top section 12.

The operation of this embodiment, after the fastener has been assembled, is substantially the same as in the previous embodiments, as for example shown in FIG. 1G, and as described in is detail hereinabove.

In another embodiment of the instant invention, better shown in FIGS. 9 and 9A, there are provided tabs 84 at the underbents 36 of the major portion 11. The tabs 84 are preferably inclined at their free end toward the respective side section for reasons to be explained hereinbelow.

The bottom section 14 has respective bottom slots 82 for the tabs 84 to be inserted when assembling the full fastener.

In this embodiment, also for practical purposes, it is important that the major portion 11 of the fastener, which as already mentioned in most occasions is made of steel which is hardened in order to get springiness among other attributes, is shaped in a manner that the distance between the two side sections 16 and 18 is larger at the portion close to the underbents 36, as compared to the distance between said side sections 16 and 18 close to the top section 12. It is also important in this embodiment that the width 14W is adequately smaller than the distance separating the side sections 16 and 18, when said sections are in parallel position to each other and perpendicular to the top section 12, so that the inclined tabs 36 can be inserted into the bottom slots 82.

In assembling the fastener, the two side sections in the vicinity of the underbents are forced to close adequately in a spring-like manner, so that the tabs 84 may be inserted into the bottom slots 82. The force closing the two side sections is then removed, and the two side sections in the vicinity of the underbents tend to open, thereby causing the tabs to hold the bottom section 14 securely in place.

The operation of this embodiment is the same as the operation of the previous embodiment for all practical purposes.

The prevailing torque (torque required to unscrew a screw or a bolt, such as screw or bolt 48 in FIG. 1G for example) may be increased by providing configurations, which make the turning of the screw or bolt more difficult.

One such example is given in the embodiment of this invention, better shown in FIGS. 10 and 10A, wherein FIG. 10 represents a perspective view, and FIG. 10 represents a cross section through line K—K of FIG. 10. An example of such configuration provides inwardly folded portions 72, which are further shaped in a manner to form a frictional section 92, the sides 94 of which frictionally hinder the screw or bolt from turning (FIG. 10A). Such frictional sections may also be formed by folding and shaping in a similar manner extensions (not shown) of the top section 12, over or under said top portion 12, as well as by folding other portions of the fastener so as to provide frictional hindrance. Thread misalignment is also considered to produce frictional hindrance.

The operation of this embodiment is similar to the operation of the previous embodiment, with the difference that the prevailing torque is considerably increased.

Fasteners of the instant invention have an additional critical advantage, that when they are in place, they are integrally connected through the top section 12, while their lower portions are held securely in position (even without the possibility of spreading apart) as being embedded within the walls (such as the wall of edge 70 having a thickness 60T for example) of the slot 62 on metal sheet 60.

The present invention also pertains a folded sheet metal fastener 10 as better shown in FIGS. 11, 11A, 11B, and 11C. The fastener 10 comprises an upper free-ended top section 12A, which has an upper top engageable continuous hole 24A. The fastener 10 also comprises a lower free-ended top section 12B which has a lower top engageable continuous hole 24B. Further, the fastener 10 comprises a bottom section 14 which has a bottom engageable continuous hole 26.

The upper top engageable hole 24A, the lower top engageable hole 24B, and the bottom engageable hole 26 are located in positions allowing coexisting engagement by a screw or bolt, or other engagement member, such as screw 48 for example, As aforementioned, it is highly preferable and critical in many applications that at least two of the upper top engageable continuous hole, the lower top engageable continuous hole, and the bottom engageable continuous hole are in a condition selected from deviating from being commensurate, being misaligned, and a combination thereof, as long as they can still by concurrently engaged with the same screw or bolt or other suitable engageable member. In this manner, the prevailing torque is highly improved, even without the need of other frictional elements.

The upper free-ended top section 12A and the lower free-ended top section 12B are connected to the bottom section 14 by a right section 18, and a left section 16, respectively.

The left section 16 comprises left snapping segments 20A and 20B (20 collectively), and the right section 18 comprises right snapping segments 22A and 22B (22B not shown) (22 collectively).

The snapping segments 20A, 20B (collectively 20), 22A, and 22B (collectively 22) comprise anti-opening portions 20A', 20B' (collectively 20'), 22A', and 22B' (collectively 22'), respectively, which dramatically increase the strength by which two or more objects, such as objects 46 and 60 for example, are held together by the fasteners of this invention, since the anti-opening portions 20A', 20B', 22A', and 22B' prevent the snapping segments from spreading apart, as being secured within the slot 62 of the object 60, such as a metal sheet for example. This extraordinary beneficial effect of the presence of the anti-opening portions on the snapping segments is also applicable to any folded sheet metal fastener comprising a bottom section having a bottom engageable continuous hole; a left section connected to the bottom and comprising a left snapping segment; and a right section also connected to the bottom and comprising a right snapping segment.

Figure 14:
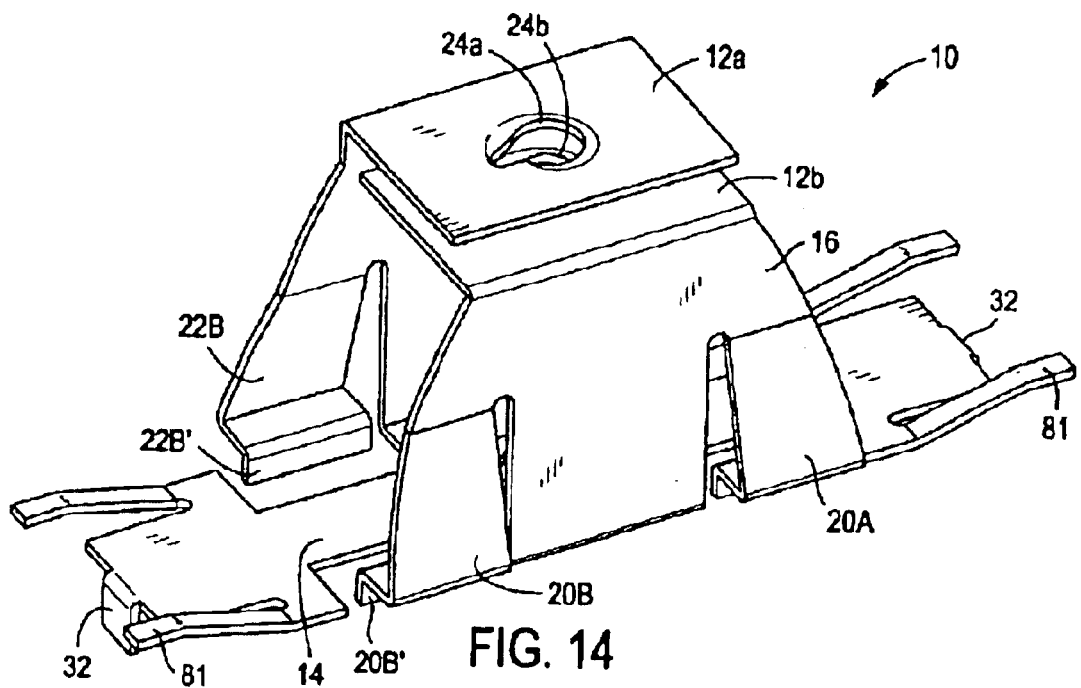
FIG. 14 is a perspective view of a fastener similar to the one shown in FIG. 11, with the difference that the fastener of FIG. 14 is further comprising underholding straps for better support of the fastener in the slot of a metal sheet.
Figure 15:
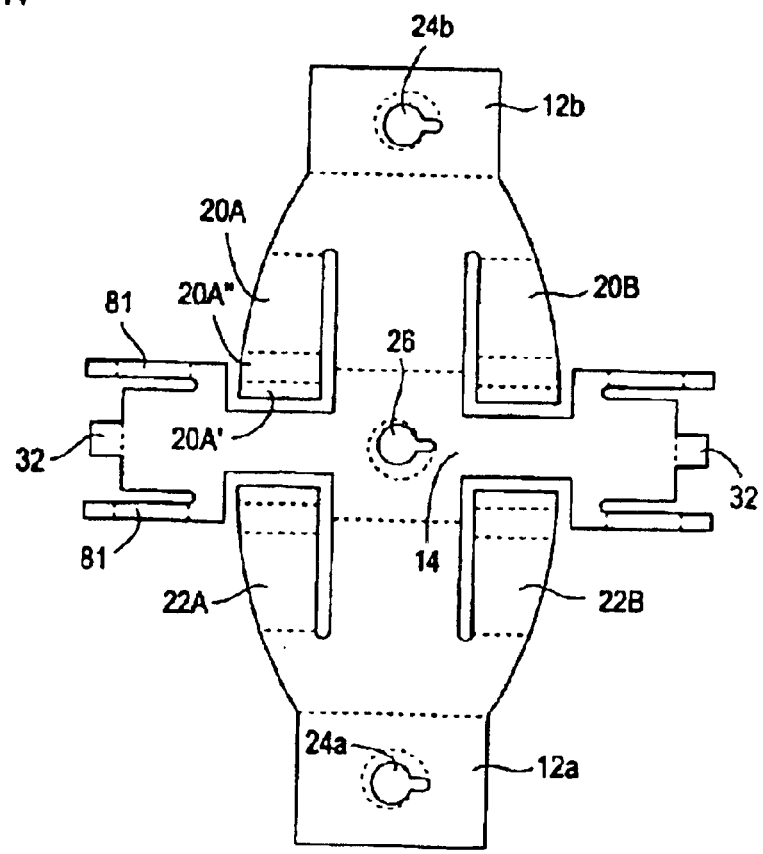
FIG. 15 represents an unfolded version of the fastener of FIG. 14.

The fastener of this embodiment may further comprise underholding straps 81, as better shown in FIG. 14, which underholding straps 81 are bended upwardly, and they better support the fastener in the slot 62 (see FIG. 1G) on the metal sheet 60. A stamped sheet metal version of the fastener 10 before folding is better shown in FIG. 15. The dotted lines denote positions at which the folding will occur to result in the shape of fastener 10 in FIG. 14.

Figure 16:
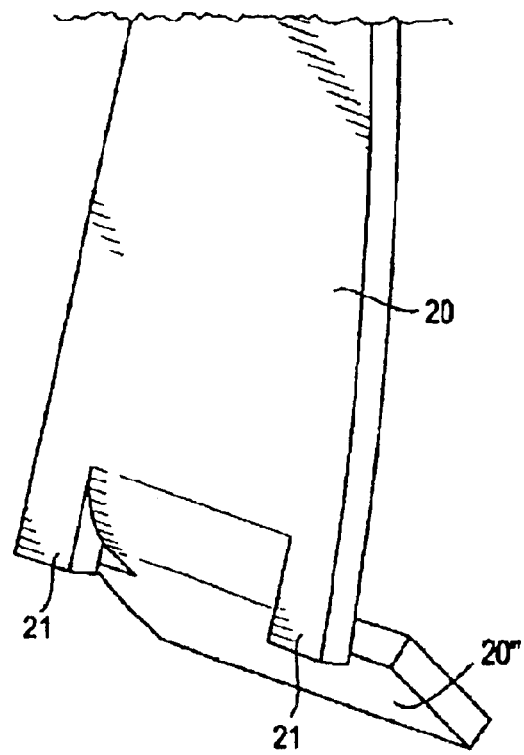
FIG. 16 is a fractional perspective view of a strapping segment, which is provided with anti-sliding portions
Figure 16A:
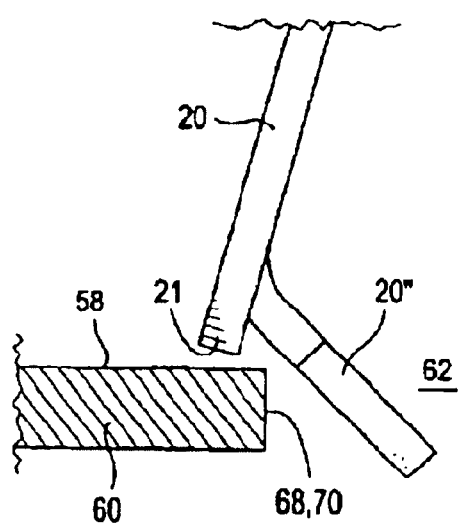
FIG. 16A is a fractional perspective view of a snapping segment within a slot of a metal sheet, wherein the anti-sliding portion is a linear extension of the snapping segment.
Figure 16B:
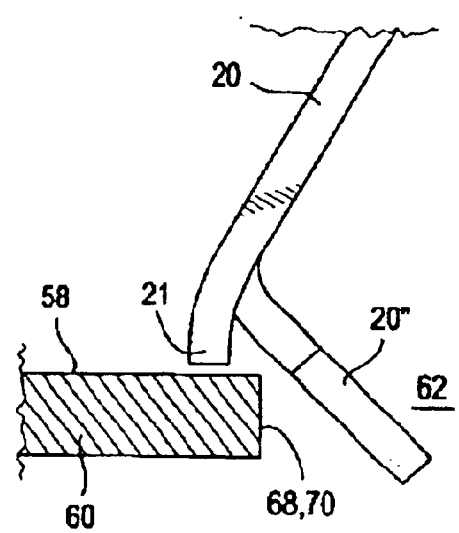
FIG. 16B is a fractional perspective view of a snapping segment within a slot of a metal sheet, wherein the anti-sliding portion is a bent extension of the snapping segment.

In a different embodiment of this invention, better shown in FIGS. 16, 16A, and 16B, the snapping segments have an inwardly bent portion 20" (see also FIG. 1F). This configuration allows higher versatility in the thickness of the metal sheet on which the fastener is secured and th4e dimensions of the slot. However, the way in which fasteners with inwardly bent portions have been used so far (lacking anti-sliding portions 21) present a very serious problem. When a considerable pulling force is applied tending to remove the fastener from the metal sheet, the snapping portions close inwardly due to sliding of the portion 20" on the edge 68 and 70 of the metal sheet 60, resulting in separation of the fastener 10 from the slot 62 of the metal sheet 60. The instant invention solves this problem very effectively by providing anti-sliding portions 21, which prevent the sliding action over a certain point, by engaging to the upper portion 58 of the metal sheet or other object 60.

The anti-sliding portions may be linear extensions of the snapping segment 20, as shown for example in FIG. 16A, or they may be bent, as shown for example in FIG. 16B. The configuration shown in FIG. 16B provides easier insertion of the fastener 10 into the slot 62 of the metal sheet 60, which in many occasions is critical.

The operation of this embodiment is substantially the same as the operation of the other embodiments, with the difference that the pulling force required to separate two parts secured by the fastener is considerably higher due to the anti-sliding portions, which portions effectively resist sliding over a certain point.

The fastener 10 may further comprise a guiding sector 33 between the bottom engageable continuous hole 26 and the lower top engageable continuous hole 24B for directing the screw or bolt from said bottom engageable continuous hole 26 to said lower top engageable continuous hole 24B.

Figure 12A:
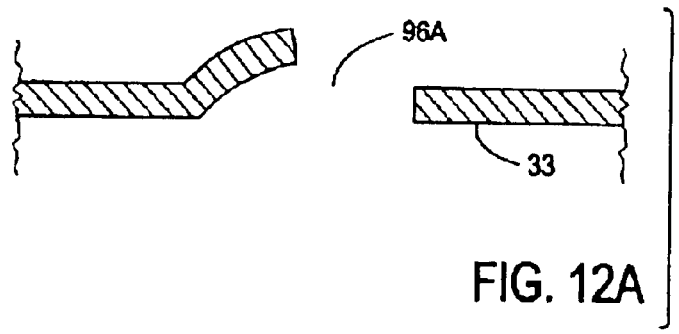
FIG. 12A is a cross sectional view of an engageable stamped hole.
Figure 12B:
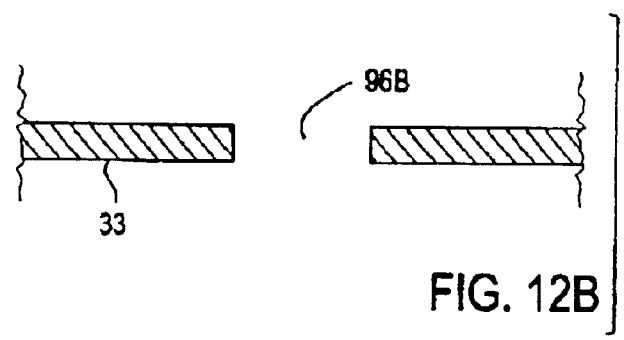
FIG. 12B is a cross sectional view of a non-engageable stamped hole.

Preferably, the guiding sector 33 comprises an element selected from guiding subsectors 35 leaning against each other, a sub-sector having a non-engageable stamped hole 96B (FIG. 12B) through which the screw or bolt can be guided, a subsector having an engageable stamped hole 96A (FIG. 12A) through which the screw or bolt can be guided, an engageable extrusion hole 98A (FIG. 13A) through which the screw or bolt can be guided, a non-engageable extrusion hole 98B (FIG. 13B) through which the screw or bolt can be guided, and a combination thereof. Any other types of holes may also be used as long as they can guide the screw or bolt or any other suitable engaging member.

Figure 13A:
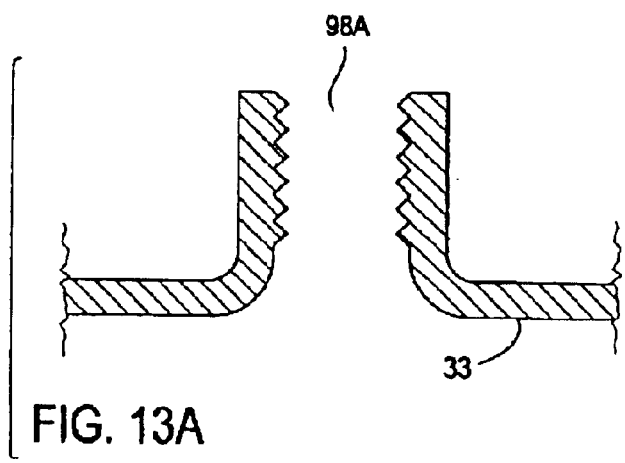
FIG. 13A is a cross sectional view of an engageable extrusion hole.
Figure 13B:
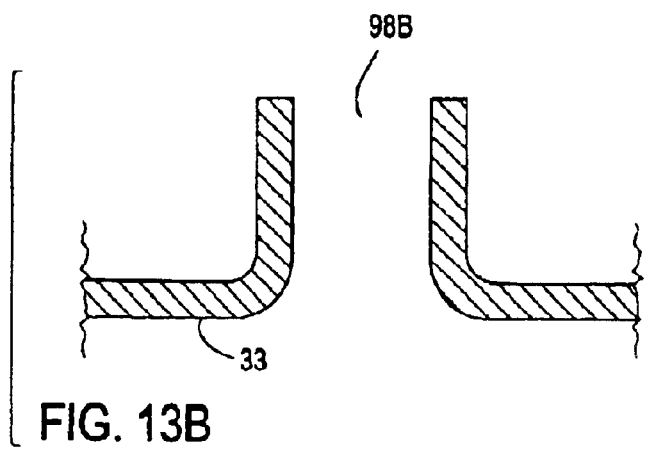
FIG. 13B is a cross sectional view of a non-engageable extrusion hole.

It is evident that if the hole 26 in any of the embodiments of the instant invention is an extrusion hole, such as the ones shown in FIGS. 13A and 13B, then hole 26 itself can also serve as a guide for the screw or bolt 48.

The guiding sub-sectors 33, 35 have preferably reinforcing base 37 disposed between said sub-sectors 33, 35 and the bottom section 14. This is very important for increasing the rigidity of the fastener's structural strength, since the reinforcing base 37 forms an angle with the bottom section 14, which angle hinders said bottom section 14 from bending.

The operation of this embodiment is substantially the same as the operation of the previous embodiments with the difference that the guiding sectors 33 direct the screw 48 very accurately, and that the anti-opening portions 20A', 20B', 22A', and 22B' dramatically increase the strength by which two or more objects, such as objects 46 and 60 for example, are held together by the fasteners of this embodiment.

In a different embodiment of the instant invention, the guiding sector 33 may be eliminated completely by forming a bottom hole 26, and by coordinating its dimensions with the dimensions of the screw to be used, as explained hereinbelow.

Figure 17:
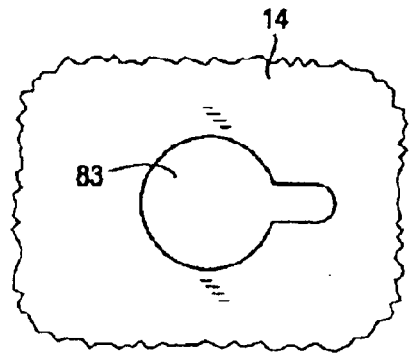
FIG. 17 is a top view of a preliminary or blank hole.
Figure 17A:
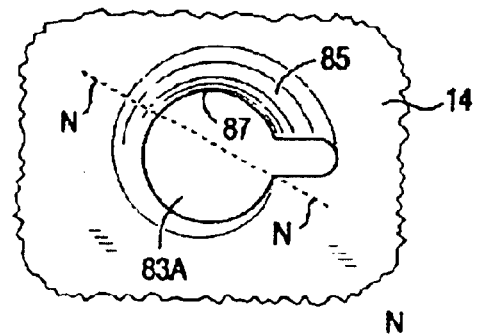
FIG. 17A is a top view of an engageable continuous hole after an impression has been formed around the hole of FIG. 17.

An example of forming an engageable continuous hole according to well known to the art techniques, is given in FIGS. 17 and 17A. A preliminary hole 83, having the shape depicted in FIG. 17 is initially formed. An impression is formed around the hole 83 in a manner that the periphery (partial periphery) 87 forms a helix corresponding to the pitch of the type of screw, which screw is going to be used with the engageable hole, thus forming the final engageable continuous hole 83A.

More than one peripheries (partial peripheries) may be formed for multi-thread screws or bolts.

Figure 18:
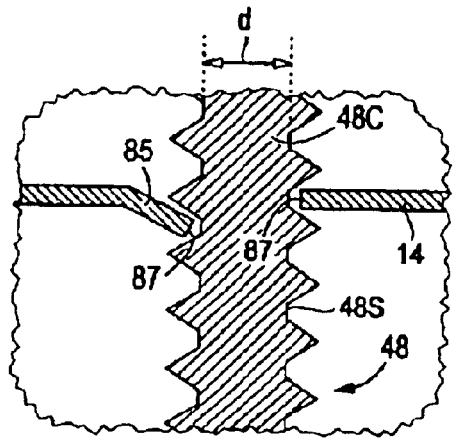
FIG. 18 is a cross sectional view of a screw engaged on the hole of FIG. 17A across line N—N, as taught by the prior art.

Since the screws have size tolerances within certain limits, the engageable holes of the state of the art are made wider than in most cases needed, in order to accommodate substantially all screws within said limits of size tolerance. Such an example is shown in FIG. 18, which includes a cross section of the hole 83A across line N—N, and wherein the periphery 87 of the engageable hole 83A is substantially wider than the core of the screw 48, the screw 48 having a minor diameter d. Minor diameter is the diameter of the core 48C of the screw 48. This has as a result free wobbling of the screw within the engageable hole 83A, and therefore, alignment with other holes is for all practical purposes very difficult, if not impossible. This is the reason why auxiliary guiding mechanisms have to be used for directing the screw toward a wanted target.

Figure 19:
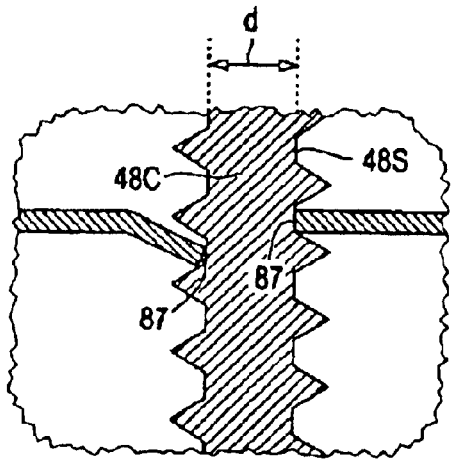
FIG. 19 is a cross sectional view of a screw engaged on the hole of FIG. 17A across line N—N according to a preferred embodiment of the instant invention.
Figure 19A:
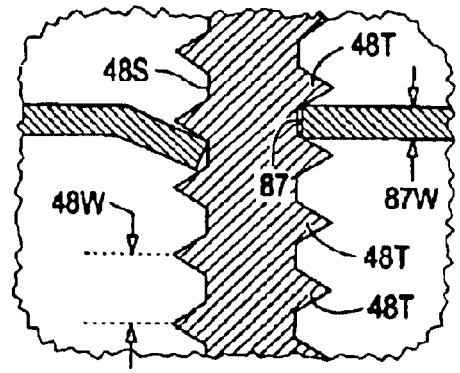
FIG. 19A is a cross sectional view of a screw engaged on the hole of FIG. 17A across line P according to another preferred embodiment of the instant invention.

According to this embodiment of the instant invention, such guiding mechanisms may be eliminated if a critical combination of a screw and an engageable hole are used. This critical combination requires that substantially the entirety of the periphery 87 of the helix substantially contacts with the surface 48S of the core 48C of the screw 48, as better shown in FIG. 19. The rigidity and alignment characteristics of the screw 48 within the engageable continuous hole 83A further increases, when in addition to the above requirements, the width 87W of the periphery 87 approaches or substantially reaches the width 48W of the core 48C between two consecutive threads 48T of the screw 48, as better shown in FIG. 19A.

The operation of this embodiment is substantially the same as the operation of the previous embodiments with the difference that the guiding sectors are not needed.

Figure 20:
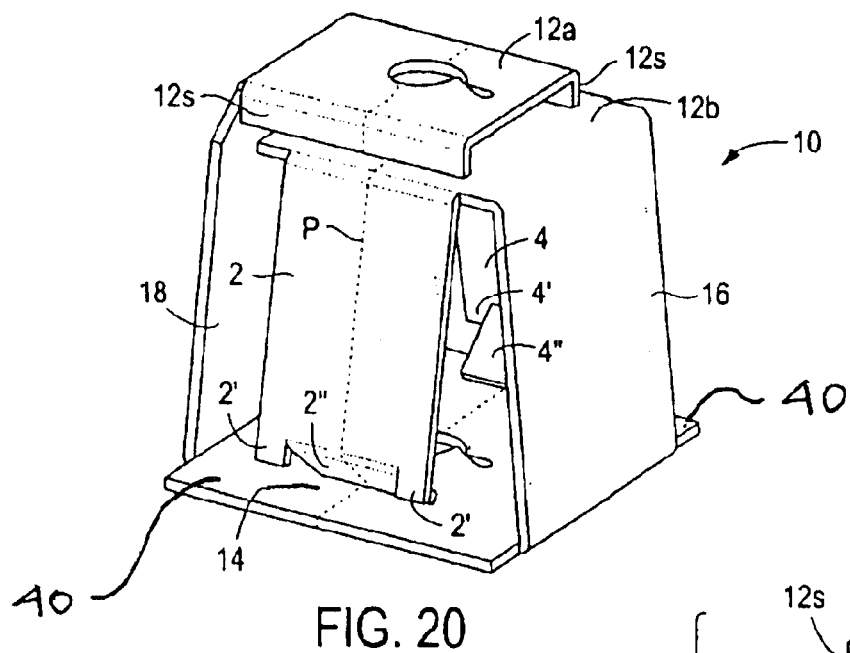
FIG. 20 is a perspective view of a fastener according to another embodiment of the instant invention, wherein the fastener comprises a front snapping segment and a back snapping segment connected to the lower free-ended top section, and wherein the upper free-ended top section provides support to the lower free-ended top section.
Figure 20A:
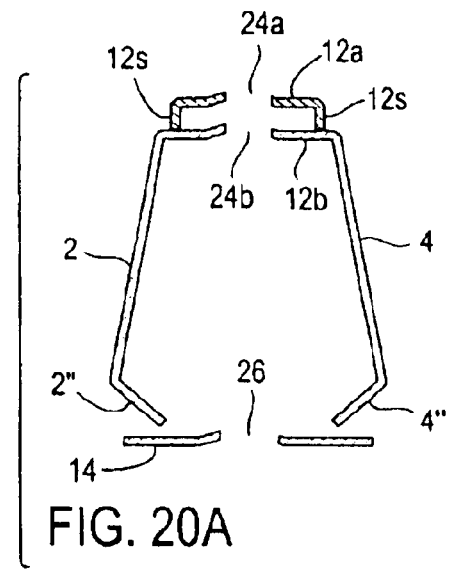
FIG. 20A is a cross-sectional view of the fastener of FIG. 20, at a plane comprising an axis passing through line P.
Figure 20B:
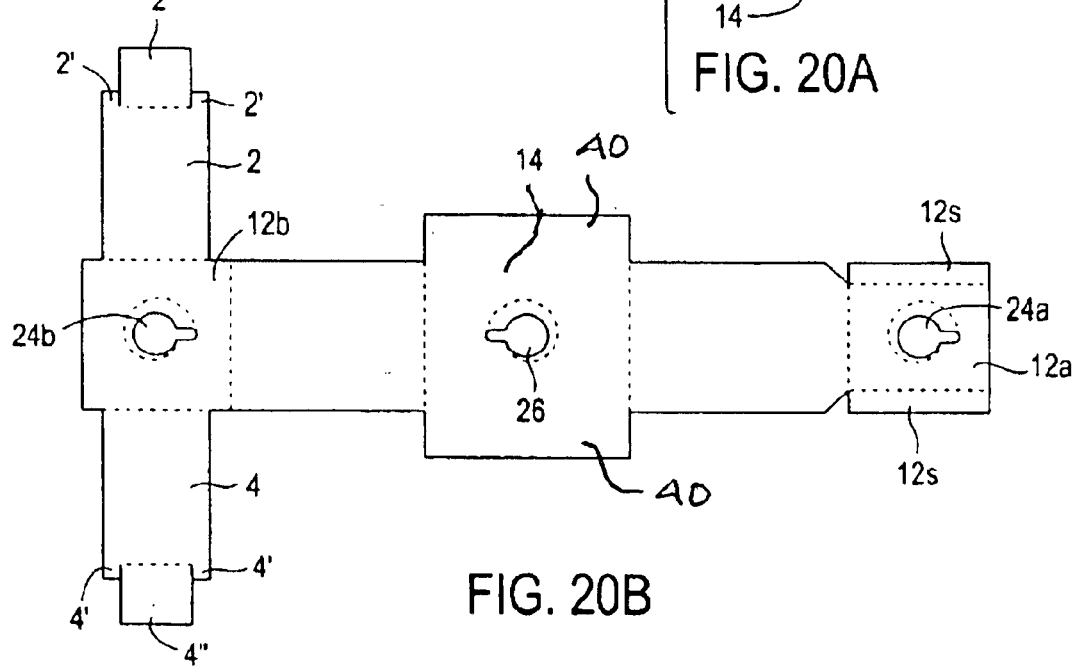
FIG. 20B represents an unfolded version of the fastener of FIGS. 20 and 20A.
Figure 20C:
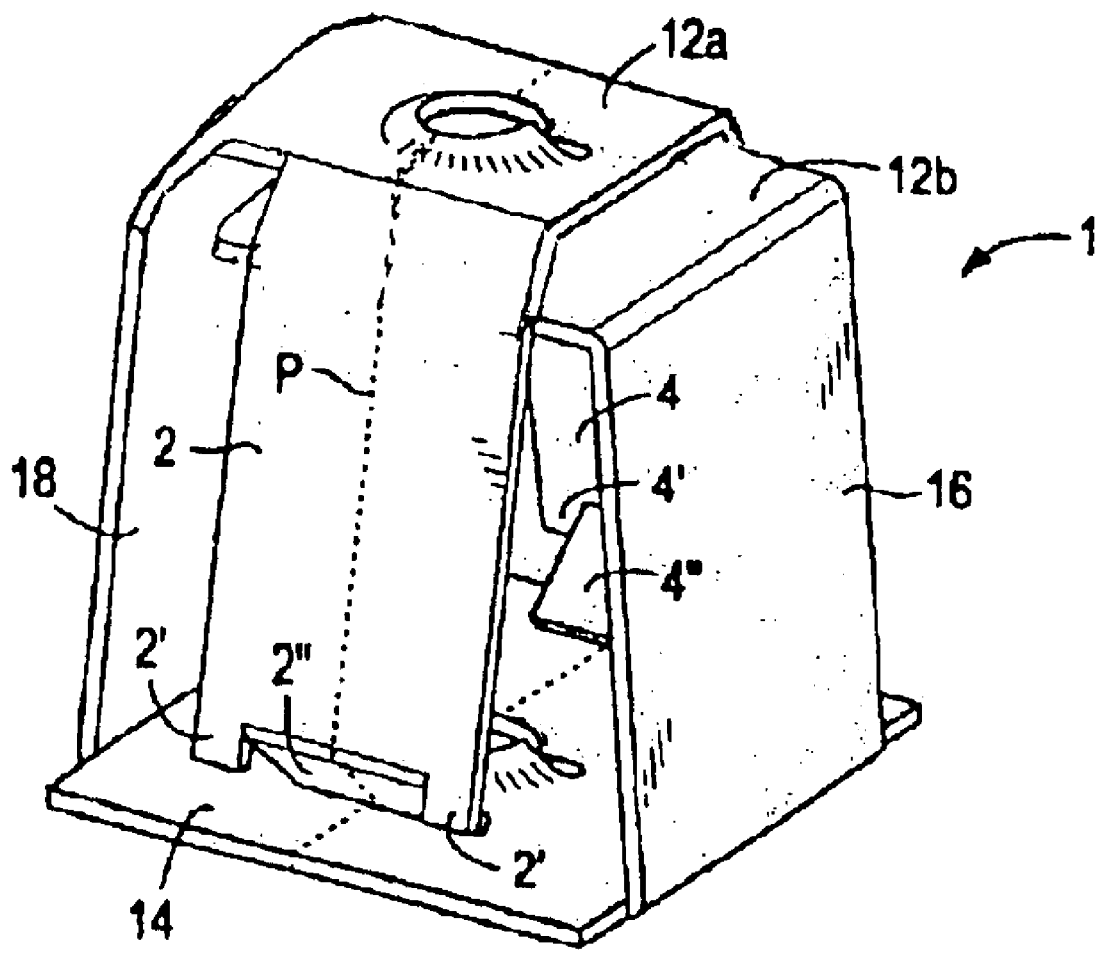
FIG. 20C is a perspective view of a fastener according to another embodiment of the instant invention, wherein the fastener comprises a front snapping segment and a back snapping segment connected to the upper free-ended top section.

In another embodiment of the present invention, better illustrated in FIGS. 20, 20A, and 20B, the folded sheet metal fastener 10 comprises an upper free-ended top section 12a having an upper top engageable continuous hole 24a. The fastener 10 also comprises a lower free-ended top section 12b having a lower top engageable continuous hole 24b. The fastener 10 further comprises a bottom section 14 having a bottom engageable continuous hole 26.

The top sections 12b and 12a are connected to the bottom section 14 by a left and a right side sections 16 and 18, respectively, while the bottom section 14 is extended by the bottom section extensions 40 disposed between the left side section 16 and the right side section 18.

A front snapping segment 2 and a back snapping segment 4 are connected to the lower free-ended top section 12b.

Figure 21:
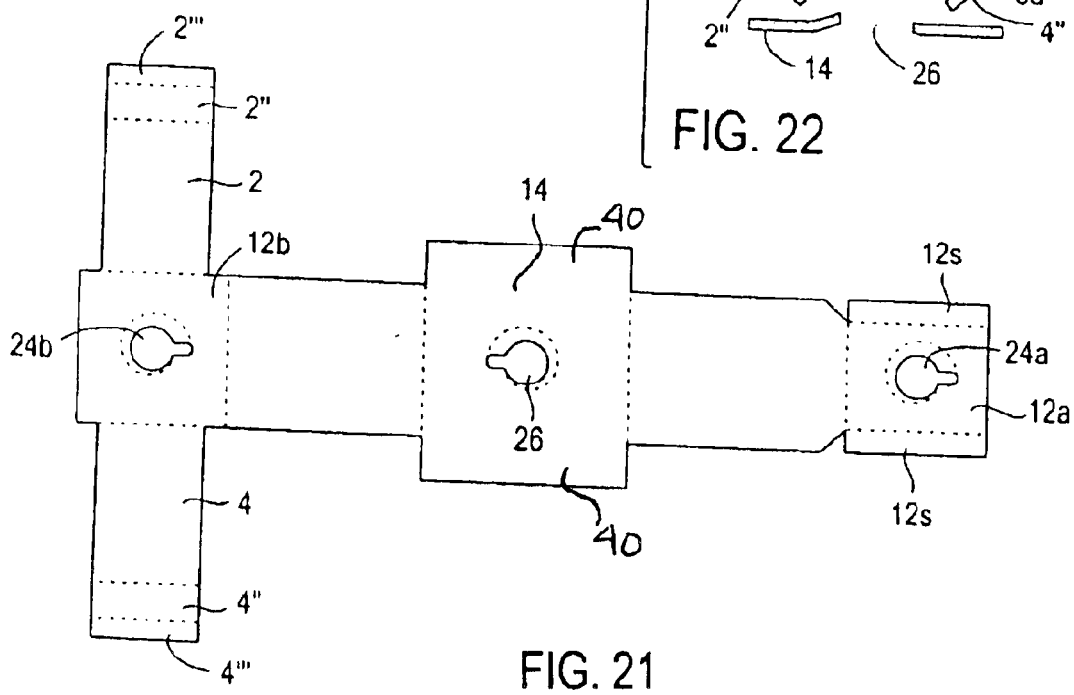
FIG. 21 represents an unfolded version of a fastener similar to the one shown in FIGS. 20, 20A, and 20B with the difference that the anti-opening portions have been replaced by anti-slipping portions

The front snapping segment 2 has an inwardly bent portion 2", while the back segment 4 has a an inwardly bent portion 4" under which there are disposed the bottom section extensions 40. The bent portions 2" and 4" further comprise anti-sliding portions 2' and 4', respectively. Instead of or in addition to the anti-sliding portions, the bent portions may comprise anti-opening portions (not shown) as described for example in the case illustrated in FIG. 14 (see for example elements indicated by numerals 20B' and 22B'). An unfolded fastener is shown in FIG. 21, wherein the anti-sliding portions 2' and 4' have been replaced by the anti-opening sections 2''' and 4'''.

The upper free-ended top section 12a comprises support bents 12s, which provide support to the lower free-ended top section 12b, thus resulting in a considerably more robust structure.

Although in this example both snapping segments 2 and 4 are connected to the lower free-ended top section, at least one of said segments 2 and 4 may be connected to at least one of the upper free-ended top section 12a and the lower free-ended top section 12b, substantially between the planes of the side sections 16 and 18.

The operation of this embodiment is substantially the same as the operation of the previous embodiments with the difference that the snapping segments are not located at the side sections, but within the two side sections.

Figure 22:
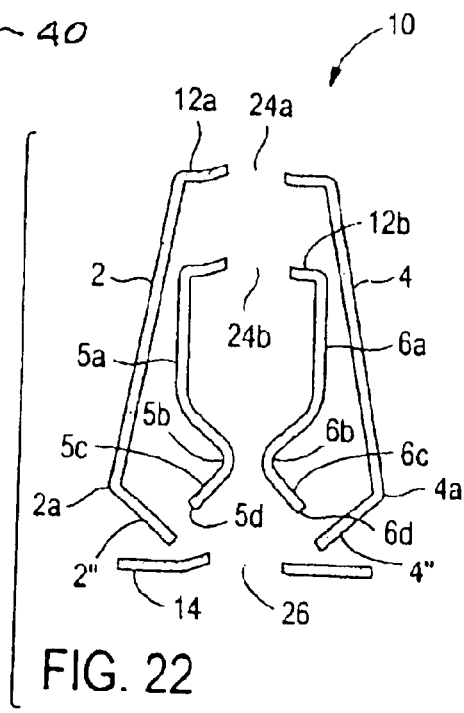
FIG. 22 is a cross-sectional view (at the same position as in the case of FIG. 20) of a fastener, wherein the both the front and back snapping segments are connected to the upper free-ended top section, and the lower free-ended top section is connected to side anti-sliding extensions.

One case in which the snapping segments are connected to the upper free-ended top section, according to another embodiment of the present invention, is exemplified by a folded sheet metal fastener, similar in many respects to the one shown in FIGS. 20, 20A and 20B, but which has a cross-section as shown in FIG. 22.

The folded sheet metal fastener 10 of this embodiment comprises an upper free-ended top section 12a having an upper top engageable continuous hole 24a. The fastener 10 also comprises a lower free-ended top section 12b having a lower top engageable continuous hole 24b. The fastener 10 further comprises a bottom section 14 having a bottom engageable continuous hole 26.

The top sections 12b and 12a are connected to the bottom section 14 by side sections (not shown) similar to the side cross sections 16 an 18 shown in FIG. 20.

A front snapping segment 2 and a back snapping segment 4 are connected to the upper free-ended top section 12b. The front snapping segment 2 comprises a bent point 2a and a bent 2". Similarly, the back snapping segment 4 comprises a bent point 4a and a bent 4".

The lower free-ended top section 12b is connected to a side anti-sliding extension 5a on one side and to a side anti-sliding extension 6a on the other side. The side anti-sliding extension 5a comprises bent corner 5b, a bent 5c, and an edge 5d. Similarly, the side anti-sliding extension 6a comprises bent corner 6b, a bent 6c, and an edge 6d. The bent corners 5b and 6b are preferably separated by a distance smaller than the major diameter (the diameter of the threads) of the screw or bolt for which the engageable continuous holes 24a, 24b, and 26 are intended.

The bents 5c and 6c, and their edges 5d and 6d, respectively, are disposed at such a positions so that they do not hinder the folded sheet metal fastener to be inserted into a slot (such as slot 62 in FIG. 1G, for example) when the screw or bolt are not engaged within the fastener. In other words, they allow the snapping segments 2 and 4 to close adequately, thereby allowing the fastener 10 to be inserted into said slot.

In operation, the fastener is first inserted into a slot (such as slot 62 in FIG. 1G, for example) on an object (such as metal sheet 60 in FIG. 1G, for example). In the process of insertion, the snapping segments 2 and 4 close initially to allow the fastener to pass through the slot, and then they open again to a certain degree, thus allowing the fastener to be supported on the object having the slot. In sequence, a screw or bolt (such as screw 48 in FIG. 1G, for example) is inserted through one or more other objects (such as objects 46 and 42 in FIG. 1G, for example), and then is threaded through the engageable continuous holes 26, 24b, and 24a, thereby supporting the other object(s) onto the object having the slot. As the screw or bolt is headed from the engageable continuous hole 26 toward the engageable continuous hole 24b, passes through the region separating the bent corners 5b and 6b, expands the side anti-sliding extensions 5a and 6a, brings the edges 5d and 6d toward the snapping segments 2 and 4, and thus, hinders or prohibits the snapping segments from being able to close. This configuration provides an outstanding mechanism of locking the objects together.

Figure 23:
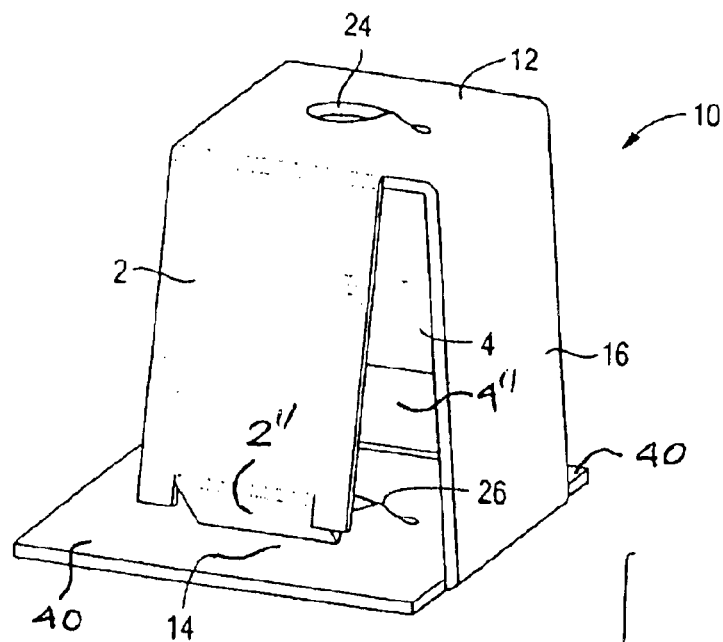
FIG. 23 is a perspective view of a fastener having a top section and a bottom section, wherein the top section is connected to a front snapping segment and a back snapping segment.

In still a different embodiment of the instant invention, better illustrated in FIG. 23, the folded sheet metal fastener 10 comprises a single top section 12 having an engageable continuous hole 24. It also comprises a bottom section 14 having an engageable continuous hole 26.

The top section 12 and the bottom section 14 are connected with a side section 16. An additional side section (not shown) may be present on the opposite side, preferably integrally connected to the top section.

The top section is further connected to a front snapping segment 2 and a back snapping segment 4.

The operation of this embodiment is substantially the same as in the case of the embodiment of the folded sheet metal fastener illustrated in FIG. 20, with the difference that an additional support is missing.

As aforementioned, the fasteners of the present invention may comprise an elastic body.

Figure 24:
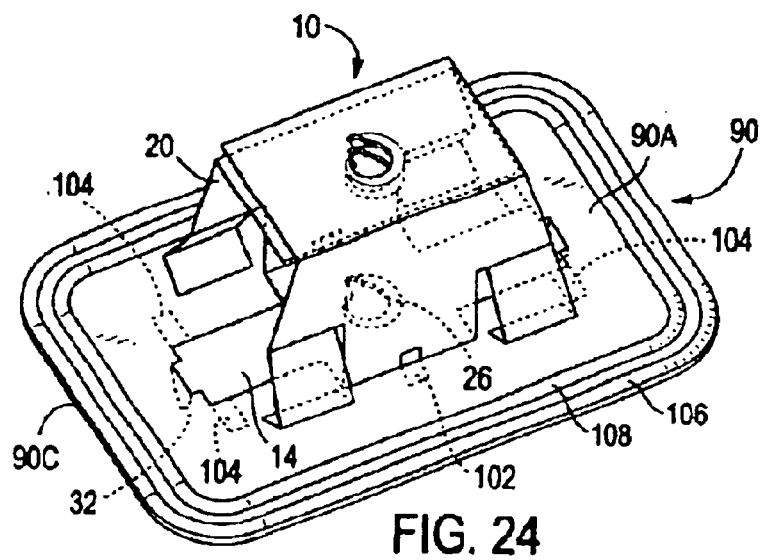
FIG. 24 is a perspective view of a folded sheet metal fastener according to another preferred embodiment of the instant invention, wherein the fastener comprises two top sections and an elastic body attached, and preferably molded, on the bottom section.
Figure 24A:
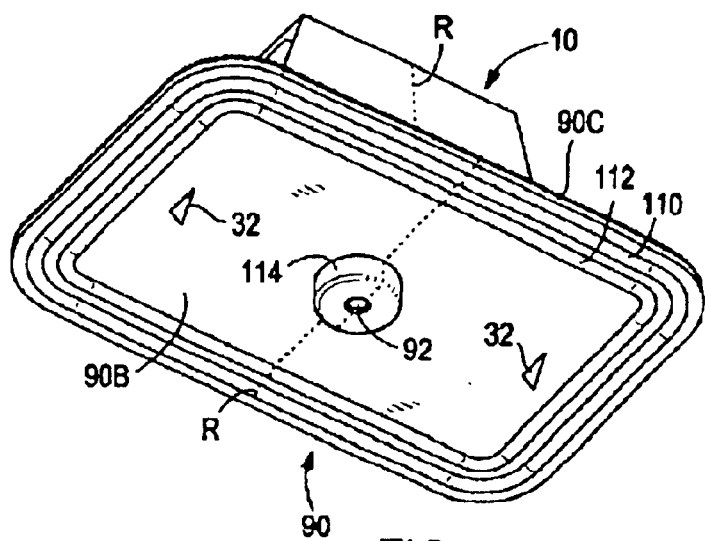
FIG. 24A is different a perspective view of the same folded sheet metal fastener illustrated in FIG. 24.
Figure 24B:
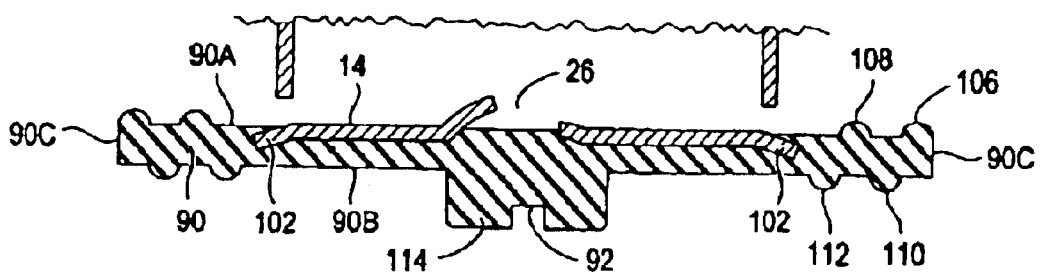
FIG. 24B is a cross-sectional view of the folded sheet metal fastener illustrated in FIG. 24A, through dotted line R—R.

In another preferred embodiment of the instant invention better illustrated in FIGS. 24, 24A, and 24B, the elastic body 90 may be attached to or molded at least under the bottom section 14 of the sheet metal fastener 10. The elastic body 90 may have an upper side 90A, a lower side 90B, and an edge 90C. The fastener may comprise holders embedded into the elastic body 90, such as for example, middle embedded holders 102, and side embedded holders 104.

The elastic body may also comprise sealing rims at least on one of the upper side 90A and lower side 90B of said elastic body 90. An example of such sealing rims are sealing rims 106 and 108 on the upper side 90A, and sealing rims 110 and 112 on the lower side 90B.

When the elastic body comprises sealing rims on both the upper side 90A and the lower side 90B of the elastic body 90, it is preferable that the sealing rims, for example rims 106 and 108, on the upper side 90A of the elastic body 90 are arranged to be in alternate positions with respect to the sealing rims, for example rims 110 and 112, on the lower side 90B of the elastic body 90, as better illustrated in FIG. 24B, which is a cross-sectional view through line R—R in FIG. 24A.

Also, one of the sealing rims, such as for example rim 106, on the top side 90A of the elastic body 90 is closest to the edge 90C of the elastic body 90 than any other sealing rim, such as for example rims 110 and 112, at the lower side 90B of the elastic body 90.

The elastic body 90 may further comprises a screw sealing portion 114 in the vicinity of the bottom engageable continuous hole 26.

The operation of this embodiment is similar to the operation of the previous embodiments, with the difference that the elastic body 90 provides sealing properties to the objects that it connects.

Figure 25:
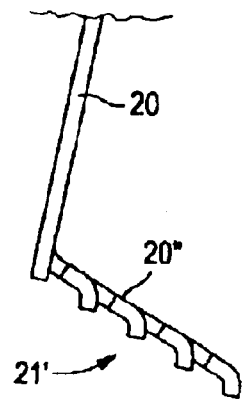
FIG. 25 is a fragmental side-view of a snapping segment with an inwardly bent portion provided with barbs.
Figure 25A:
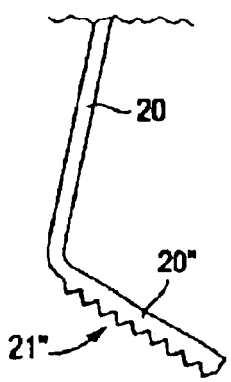

As aforementioned, the snapping segments of this invention may have anti-opening and anti-sliding portions. The anti-sliding portions may comprise an element selected from extension of the snapping segment 20 as also aforementioned, or barbs 21' on the bent 20", as exemplified in FIG. 25, or ridges or knurls 21" on the bent 20", as exemplified in FIG. 25A, or a combination thereof.

It should be noted that this invention also includes fasteners having an upper free ended section, a lower free ended section, and a bottom section, wherein only the holes of the upper free ended section and the bottom section are engageable continuous holes. The lower free ended section may have any type of hole.

It should also be noted that this invention further includes any fasteners having snapping segments 20 and comprising a bent 20" having a portion selected from anti-opening portion, anti-sliding portion and a combination thereof, the anti-sliding portion comprising an element selected from— extension of the snapping segment, barbs on the bent, ridges on the bent, knurls on the bent, and a combination thereof, as exemplified in FIGS. 16, 16A, 16B, 25 and 25A.

Figure 11:
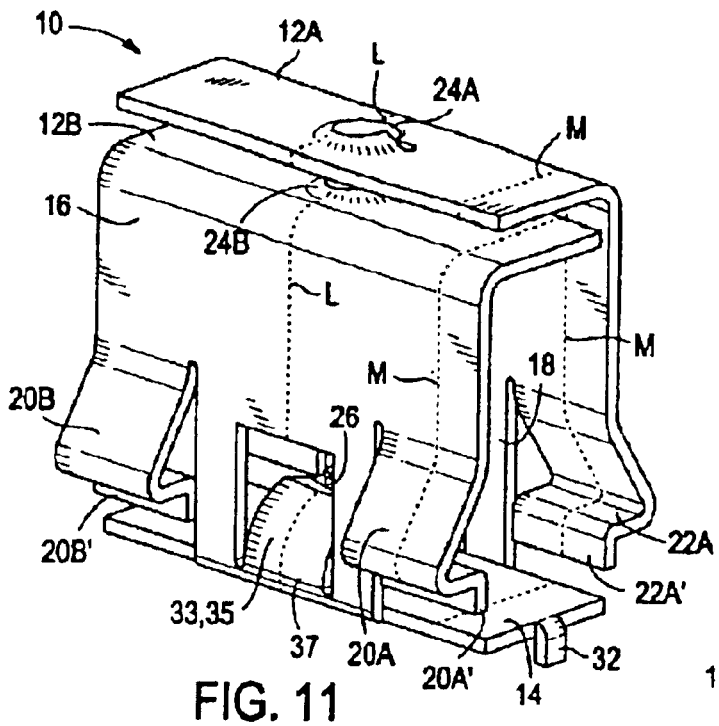
FIG. 11 is a perspective view of a folded sheet metal fastener according to another preferred embodiment of the instant invention, wherein the fastener comprises two top sections, a guiding sector, and anti-opening portions on the snapping segments.
Figure 11A:
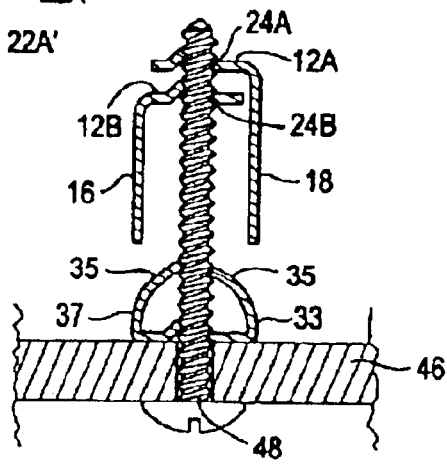
FIG. 11A is a cross sectional view through line L of the fastener shown in FIG. 11, after said fastener has been supported on a first object, such as a headliner for example, by a screw.
Figure 11B:
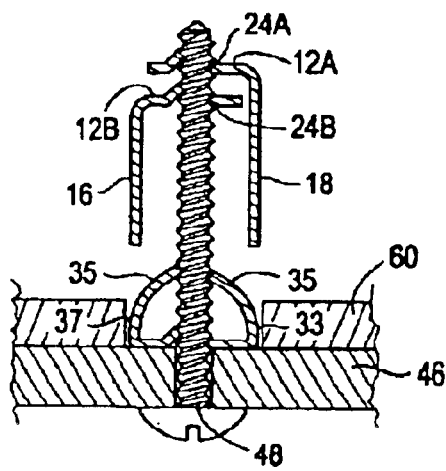
FIG. 11B is a cross sectional view through line L of the fastener shown in FIG. 11, after said fastener has been supported on a first object by a screw, and inserted to a second object, such as a metal sheet for example, through a slot.
Figure 11C:
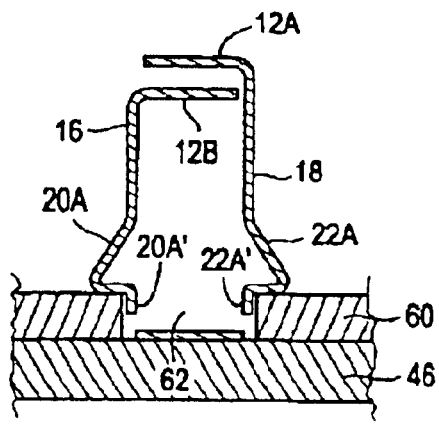
FIG. 11C is a cross sectional view through line M of the fastener shown in FIG. 11, after said fastener has been supported on a first object by a screw, and inserted to a second object, such as a metal sheet for example, through a slot.

In the case that the screw 48 extends through the upper complete engageable hole 24A, as exemplified in FIGS. 11A and 11B, at least the part of the screw extending through may be covered by a soft material, such as plastic or elastomer for example, to avoid scratching the object into which the fastener is to be inserted. As a matter of fact, any part of the fasteners of the present invention may be covered by a soft material, such as plastic or elastomer for example.

Reinforcing ribs, well known to the art, may be used on any part of the fasteners of the present invention in order to decrease the flexibility of said part. The same is true not only for flat surfaces, but also for curved or corner surfaces.

One or more of the above embodiments may be exercised simultaneously. For example, multiple engageable continuous hole configurations may be formed providing extraordinary strength. Any holes, engageable or not may be stamped holes (as provided for example in "quick nuts", well known to the art) or extrusion holes (which are also well known to the art and provide good alignment characteristics for the screw or bolt 48, and which may be used for this purpose), or any other type of hole. Further, any features described in one embodiment may be used in any other embodiment. For example, in any of the embodiments of this invention, at least one of the snapping segments may comprise a portion selected from anti-opening portion, anti-sliding portion, and a combination thereof.

In many of the embodiments of the instant invention, the existence of only continuous engagement holes are necessary, while in other embodiments, arcs or other types of incomplete holes may be used partially.

Dotted lines in the Figures indicate locations in which bents are performed, unless the lines are characterized as defining cross-sections.

The embodiments described hereinabove serve illustration purposes only regarding this invention, which should only be bound by the claims.

Any explanations given are speculative and should not restrict the scope of the claims.

As aforementioned, vehicles comprising objects connected with fasteners of the present invention do also belong to the instant invention as described and claimed. Substantially any parts of a vehicle which need fastening to each other may be fastened by the fasteners of the present invention. Some examples of such parts are headliners to the ceiling, roof-racks to the roof, dash-boards to a frame, handles of different shorts to doors, ceiling, sides, lights to a frame, etc.

What is claimed is:

1. A folded sheet metal fastener comprising:
    an upper free-ended top section having an upper top engageable continuous hole;
    a lower free-ended top section having a lower top engageable continuous hole;
    a bottom section having a bottom engageable continuous hole;

a left section and a right section, the top sections and the bottom section being connected by the left section and the right section;

a front snapping segment and a back snapping segment, wherein at least one of said segments is connected to at least one of the upper free-ended top section and the lower free-ended top section, substantially between the planes of the left section and the right section, each one of the front snapping segment and the back snapping segment comprising an inwardly directed bent portion; and bottom section extensions disposed between the left side section and the right side section, under the front snapping segment and the back snapping segment.

2. A fastener as defined in claim 1, wherein both the front and the back snapping segments are connected to the lower free-ended top section.

3. A fastener as defined in claim 2, wherein the upper free-ended top section provides support to the lower free-ended top section.

4. A fastener as defined in claim 3, wherein at least one of the snapping segments comprises a portion selected from anti-opening portion, anti-sliding portion, and a combination thereof.

5. A fastener as defined in claim 2, wherein at least one of the snapping segments comprises a portion selected from anti-opening portion, anti-sliding portion, and a combination thereof.

6. A fastener as defined in claim 1, wherein the upper free-ended top section provides support to the lower free-ended top section.

7. A fastener as defined in claim 6, wherein at least one of the snapping segments comprises a portion selected from anti-opening portion, anti-sliding portion, and a combination thereof.

8. A fastener as defined in claim 1, both the front and the back snapping segments are connected to the upper free-ended top section.

9. A fastener as defined in claim 8, further comprising side anti-sliding extensions connected to the lower free-ended top section.

10. A fastener as defined in claim 9, wherein at least one of the snapping segments comprises a portion selected from anti-opening portion, anti-sliding portion, and a combination thereof.

11. A fastener as defined in claim 8, wherein at least one of the snapping segments comprises a portion selected from anti-opening portion, anti-sliding portion, and a combination thereof.

12. A fastener as defined in claim 1, wherein at least one of the snapping segments comprises a portion selected from anti-opening portion, anti-sliding portion, and a combination thereof.

13. A vehicle comprising objects connected with a folded sheet metal fastener, the fastener comprising:

an upper free-ended top section having an upper top engageable continuous hole;

a lower free-ended top section having a lower top engageable continuous hole;

a bottom section having a bottom engageable continuous hole;

a left section and a right section, the top sections and the bottom section being connected by the left section and the right section;

a front snapping segment and a back snapping segment, wherein at least one of said segments is connected to at least one of the upper free-ended top section and the lower free-ended top section, substantially between the planes of the left section and the right section, each one of the front snapping segment and the back snapping segment comprising an inwardly directed bent portion; and bottom section extensions disposed between the left side section and the right side section, under the front snapping segment and the back snapping segment.

14. A vehicle as defined in claim 13, wherein both the front and the back snapping segments are connected to the lower free-ended top section.

15. A vehicle as defined in claim 14, wherein the upper free-ended top section provides support to the lower free-ended top section.

16. A vehicle as defined in claim 15, wherein at least one of the snapping segments comprises a portion selected from anti-opening portion, anti-sliding portion, and a combination thereof.

17. A vehicle as defined in claim 14, wherein at least one of the snapping segments comprises a portion selected from anti-opening portion, anti-sliding portion, and a combination thereof.

18. A vehicle as defined in claim 13, wherein the upper free-ended top section provides support to the lower free-ended top section.

19. A vehicle as defined in claim 18, wherein at least one of the snapping segments comprises a portion selected from anti-opening portion, anti-sliding portion, and a combination thereof.

20. A vehicle as defined in claim 13, wherein both the front and the back snapping segments are connected to the upper free-ended top section.

21. A vehicle as defined in claim 20, wherein the fastener further comprises side anti-sliding extensions connected to the lower free-ended top section.

22. A vehicle as defined in claim 21, wherein at least one of the snapping segments comprises a portion selected from anti-opening portion, anti-sliding portion, and a combination thereof.

23. A vehicle as defined in claim 20, wherein at least one of the snapping segments comprises a portion selected from anti-opening portion, anti-sliding portion, and a combination thereof.

24. A vehicle as defined in claim 13, wherein at least one of the snapping segments comprises a portion selected from anti-opening portion, anti-sliding portion, and a combination thereof.

* * * * *